United States Patent
Gabler et al.

(10) Patent No.: US 10,834,253 B1
(45) Date of Patent: Nov. 10, 2020

(54) SYSTEM AND METHOD FOR PROTECTING USER INFORMATION THAT IS ASSOCIATED WITH A SHIPMENT

(71) Applicant: AMAZON TECHNOLOGIES, INC., Seattle, WA (US)

(72) Inventors: David Ruysser Gabler, Atascadero, CA (US); Aaron Michael Brown, Seattle, WA (US); John E Darrow, Shoreline, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 141 days.

(21) Appl. No.: 16/051,198

(22) Filed: Jul. 31, 2018

(51) Int. Cl.
  *H04M 3/42* (2006.01)
  *H04W 4/02* (2018.01)
  *G06Q 10/08* (2012.01)

(52) U.S. Cl.
  CPC ...... *H04M 3/42008* (2013.01); *G06Q 10/083* (2013.01); *H04W 4/02* (2013.01); *H04M 2203/6009* (2013.01)

(58) Field of Classification Search
  CPC .. G06Q 30/0601; G06Q 30/06; G06Q 10/083; H04M 3/42059; H04M 3/42; H04M 3/42008
  USPC .................................. 379/201.01; 705/26.1
  See application file for complete search history.

(56) References Cited

U.S. PATENT DOCUMENTS

| | | | |
|---|---|---|---|
| 9,430,777 B1* | 8/2016 | Strand | G06Q 30/0207 |
| 9,973,625 B1 | 5/2018 | Voorhees | |
| 2001/0036259 A1 | 11/2001 | Larger | |
| 2003/0220976 A1 | 11/2003 | Malik | |
| 2006/0227803 A1 | 10/2006 | Malik | |
| 2011/0159861 A1 | 6/2011 | Pratt et al. | |
| 2015/0026818 A1 | 1/2015 | Lee et al. | |
| 2017/0099376 A1 | 4/2017 | Agrawal | |

* cited by examiner

*Primary Examiner* — Rasha S Al Aubaidi
(74) *Attorney, Agent, or Firm* — Lindauer Law, PLLC

(57) ABSTRACT

A server may assign a temporary phone number and an extension number to a shipment. The temporary phone number may be based on a geographic location of where the shipment is to be delivered. The extension number is associated with the shipment. The temporary phone number and extension number may be included on a shipping label rather than the user's phone number. During the delivery of the shipment, a delivery person may encounter a delivery issue, such as needing directions. The delivery person may call the temporary phone number and extension number and be connected to a user device. The delivery person may communicate the delivery issue, such as asking for directions to the user's residence. Upon delivery of the shipment, the server disassociates the temporary phone number and the extension number from the shipment.

20 Claims, 10 Drawing Sheets

SYSTEM AND METHOD FOR PROTECTING USER INFORMATION THAT IS ASSOCIATED WITH A SHIPMENT

BACKGROUND

As users' time demands increase, users are experiencing a rapid decrease in time available for activities such as shopping. In response, mail order, online electronic shopping, and other home shopping services have grown rapidly as users demand more security with regards to user information presented on the ordered packages.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
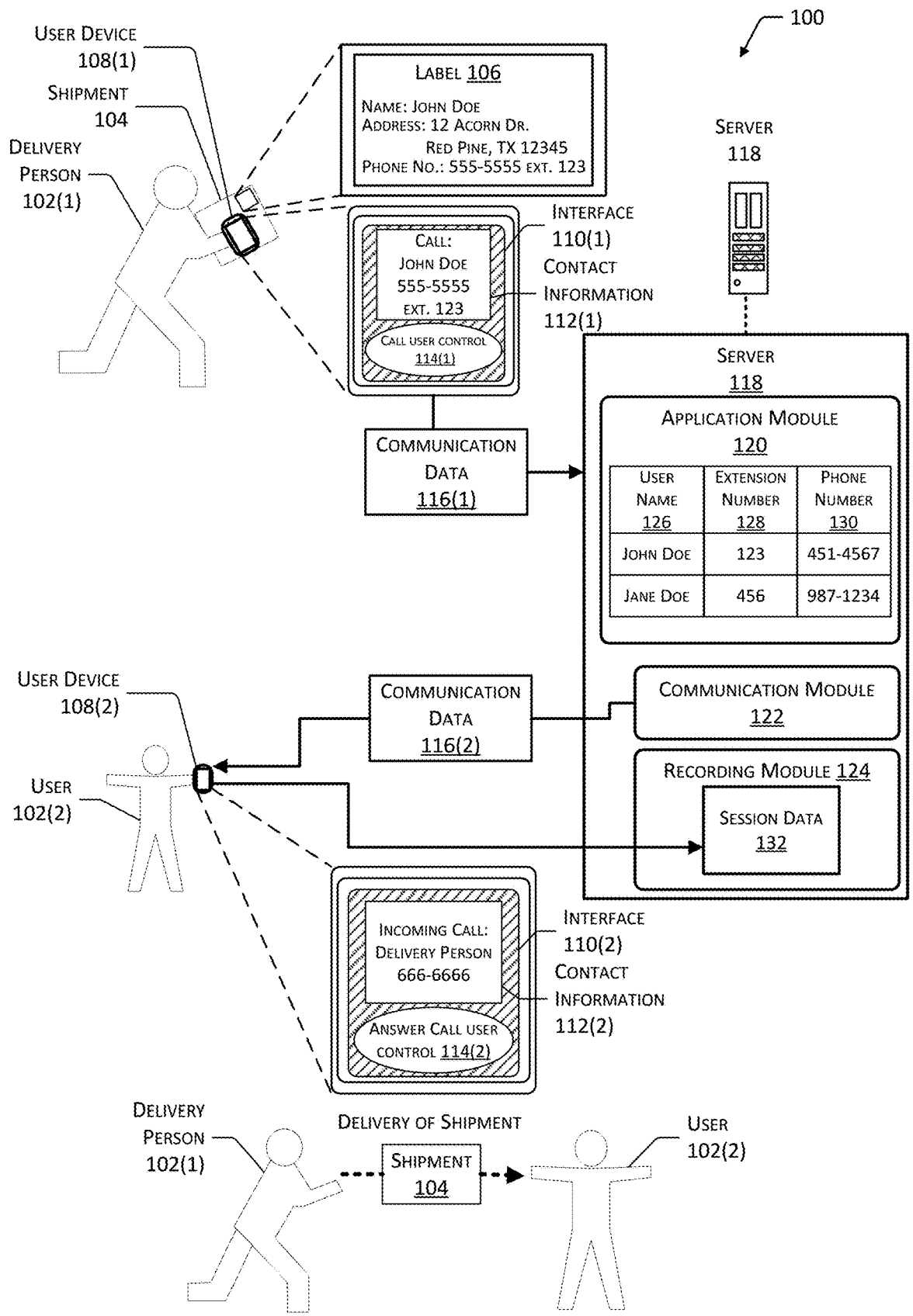
FIG. 1 depicts a schematic of a system for protecting user information that is associated with a shipment.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Users are able to access applications, via networks such as the Internet, to purchase items. A user may purchase item(s) and provide a physical address and a phone number that is printed on a shipping label. In addition, to the phone number, the user's name, and address may be printed on the shipping label, included in an electronic shipping manifest, or otherwise be provided to a shipper and the employees of the shipper. For example, the user may purchase a barbell weight set and provide his phone number is 444-4567. During the shipment of the item, a delivery person may call the user if there is a delivery issue. The delivery person may obtain the user's phone number based on the user's phone number being printed on the shipping label. For example, the delivery person may call the user asking the user for a passcode to enter the user's apartment building, directions to the user's residence, description of the user's residence, and so forth. After, the call the delivery person may deliver the item to the shipping address. By having the user's phone number exposed on the shipping label other users may obtain the user's phone number. This may cause the user to receive unsolicited phone calls. For example, a passerby may obtain the user's phone number and prank call the user, solicitate the user to purchase unwanted items, or make calls that the user does not want to receive.

This disclosure describes systems and methods for protecting user information that is associated with a shipment. A user may access an application, via a network such as the Internet, to purchase an item. For example, the user may purchase a barbell weight set. The order may be sent to a server that includes an application module. The application module may determine a geographic location of the destination for where the ordered item is to be delivered. The destination may be a user's residence, office building, storage locker, meet-ups, and so forth. The geographic location may be a country, state, province, city, town, zip code, and so forth. The application module may assign a communication address based on the geographic location. The communication address may be a temporary phone number and an extension number to that particular order and user account. For example, the application module may determine that the user's residence is within Basswood City. The application module may associate a temporary phone number 555-5555 with an extension number of 123 to the user account. The assigned communication address is different than the phone number included in the user account. For example, the phone number included in the user account may be 444-4567, while the assigned communication address may be 555-5555.

The application module may generate shipping information. For example, the application module may generate a shipping label and handling instructions. The shipping label may include the user's name, address, and communication address. The handling instructions may indicate one or more parameters. For example, the handling instructions may indicate that the order is fragile, requires a signature, type of shipping method, such as second day air, and that the order should not be delivered on Saturdays.

A delivery person may need to contact the recipient of the purchased item. For example, the delivery person may not be able to complete delivery of the ordered item due to a delivery issue. The delivery issue may be an incorrect, inaccurate, or confusing address, a passcode to enter the user's residence or apartment building, delay in the delivery, and so forth. The delivery person may call the communication address, which causes communication data to be sent to the server. The communication data may include information indicating that the delivery person placed the call and may also include the communication address.

The application module, upon receipt of the communication data, may determine the user account associated with the communication address. For example, the application module may determine that the extension number 123 is associated with order number 456987 for the barbell weight set and that the user account is for John Doe. The application module may determine that the user's phone number is 444-4567. The application module may forward the communication data and include the user's phone number to a communication module. The communication module may contact the user device associated with the user's phone number. For example, the communication module may initiate a call to the phone number 444-4567 to establish communication between the delivery person's device and the user device. The delivery person may accept the call and communicate to the user about the delivery. For example, the delivery person may ask the user for directions to the user's residence or ask questions about what the user's residence looks like, such as color of the user's residence. In other examples, the communication between the delivery person and the user may be short message service (SMS), text messaging, electronic mail (E-mail), voice to SMS, SMS to voice, voice to text messaging, text messaging to voice, and so forth.

The application module, prior to forwarding the communication data to the communication module, may access user communication parameters. The user communication parameters may indicate the type of communication a user prefers, times of the day a user is available, times of the day a user is not available, days of the week the user is available, days of the week the user is not available, and so forth. For example, the user communication parameters may indicate that the user prefers to be contacted first by a phone call and second by SMS messaging. The user communication parameters may indicate that the user is only available Monday, Wednesday, and Friday between 3:00 pm through 5:00 pm. In addition, the user communication parameters may indicate that the user is unavailable on national holidays. If the delivery person attempts to contact the user during a period of time that the user is unavailable, the application module may prevent connection with the user. In other examples, the application module may connect the delivery person to communicate with a voice mailbox associated with the user device, rather than preventing connection with the user.

The server may include a recording module that records the communication between the delivery person and the user with the consent of both parties. For example, the recording module may record, with the consent of both parties, the delivery person asking the user for directions to the user's residence. A review service may review the recording and generate delivery review data. The delivery review data may include information about the delivery person, such as name, employee number, and so forth, duration of the communication, delivery person's demeanor, type of communication, such as phone call, SMS, and so forth. The delivery review data may be used to evaluate the performance of the delivery person, the delivery of the ordered item, performance of the shipper, and so forth.

The delivery person's device, upon delivering the item, may send confirmation data to the server that indicates successful delivery. Responsive to completion of the delivery, the application module may remove the association of the communication address with the user account. For example, the application module may disassociate the extension number 123 from John Doe's user account after the barbell weightlifting set has been delivered. In this example, if the delivery person was to use the temporary phone number 555-5555 with extension number 123, the delivery person would not necessarily be able to contact John Doe. In other examples, the application module may disassociate the extension number from the user account after a period of time has expired. The period of time may be a few minutes, hours, days, and so forth. By removing the association with the communication address from the user account, the application module may reuse those numbers for subsequent orders, never reuse those numbers, or reuse those numbers after a period of time has expired. For example, the temporary phone number 555-5555 and the extension number 123 may only be reused in association with John Doe's user account after three days have passed or John Doe has placed five subsequent orders. In another example, the application module may assign the temporary phone number 555-5555 and the extension number 123 to Jane Doe's user account in response to Jane Doe placing an order or shipment.

After receiving the order, the user may call the communication address using the user device associated with the user account. For example, the user may call 555-5555 extension 123. The application module may receive the communication data and determine that the phone call is being initiated by the user device associated with the user account. For example, the application module may determine that the phone call is originating from the user device associated with the phone number 444-4567. The communication data may also include order information. For example, the order information may include an order number, description of the items in the order, issues with the order or items, and so forth. The communication module may connect the user device to customer service and forward the order information to the customer service. Once connected the user may communicate with the customer service representative. In other examples, the communication module may connect the user to an interactive voice response (IVR) system to initiate a process of returning the ordered item.

By using the techniques and systems described above, for example protecting user information that is associated with a shipment, the system improves security. The security is improved by protecting user information, such as the user's phone number from other users, shippers, employees of the shippers, computer hackers of the shipper's computer system, and so forth. For example, a passerby of an item delivered to a front door would not be able to obtain the user's phone number from the shipping label. Rather, the passerby would obtain a temporary phone number and an extension number that is no longer associated with the user's phone number. In another example, an employee of the shipper would not be able to obtain the user's phone number and make unsolicited phone calls to the user, sell the user's phone number to other users, or make public the user's phone number. Rather, the employee would obtain a temporary phone number and an extension number that is no longer associated with the user's phone number. In addition, security is improved as the user is protected from receiving unsolicited phone calls seeking to obtain additional user information for the user, such as social security numbers, bank account numbers, and so forth. The system may also improve accessibility to users who are unable or unwilling to communicate in a particular modality. For example, a hearing-impaired user may utilize the system to establish communication between a voice modality and a text modality. Continuing the example, the system may transcribe and produce text from speech uttered by the employee and then use a text to speech system to provide audible output from text typed by the user.

The system also provides additional advantages to users by providing a streamlined user interface. For example, if the user calls the temporary phone number and extension number from their cellphone associated with that temporary phone number and extension number for the shipment, the user's call may be routed directly to customer service. The customer service operator, based on the incoming call being made to that particular temporary phone number and extension, may then be presented with information about the shipment. As a result, the user experiences an improved user interface, as does the customer service representative.

Illustrative System

FIG. 1 depicts a schematic of a system 100 for protecting user information that is associated with a shipment. A delivery person 102(1) may deliver a shipment 104 to a user 102(2). The shipment 104 may be an order placed by the user 102(2), a gift sent to the user 102(2), information sent to the user 102(2), and so forth. For example, the user 102(2) may place an order for an item, such as a barbell weight set. In another example, a relative, friend, colleague, and so forth, may send an item to the user 102(2), such as clothes. The shipment 104 may include a label 106. The label 106 may include a communication address. The communication address may include the name of the user 102(2), an address associated with the user 102(2), a temporary phone number, a username, a network address, and so forth. The address associated with the user 102(2) may be the user's residence, a place of business, a locker configured to accept the shipment 104, an address of a location of a vehicle associated with the user 102(2), and so forth. The temporary phone number may be associated with the shipment 104 and specific to a geographic location of the address. For example, the label 106 may include the user's name John Doe, the address 12 Acorn Drive, Red Pine, Tex. 12345, and a temporary phone number 555-5555 with an extension number 123. Different shipments may be associated with different temporary phone numbers, etc. Continuing the earlier example, a second shipment to the same user 102(2) would have the same address but may have a different temporary phone number, username, network address, and so forth associated with that second shipment.

The temporary phone number is different than the user's actual phone number. The use of a temporary phone number or temporary communication address improves security by protecting user information, such as the user's phone number from other users, shippers, employees of the shippers, computer hackers of the shipper's computer system, and so forth. For example, a passerby of the shipment 104 delivered to the user's address would not be able to obtain the user's phone number from the label 106. Rather, the passerby would obtain the temporary phone number 555-5555 and an extension number 123 that, as discussed in more detail below, is no longer associated with the user's phone number based on the shipment 104 having already been delivered. In another example, a network address may be used. The network address may be 192.123.45.6/78. In yet another example, a username may be used. The username may be associated with a telecommunications application software product that may provide communication between user devices 108.

The delivery person 102(1) may need to contact the user 102(2). For example, the delivery person 102(1) may not be able to complete delivery of the shipment 104 due to a delivery issue. The delivery issue may be an incorrect, inaccurate, or confusing address, a passcode to enter the user's residence or apartment building, delay in the delivery, and so forth. The delivery person 102(1) may call the temporary phone number and extension number using user device 108(1). The user device 108(1) may be a television, tablet computer, personal computer, electronic book reader, gaming console, set-top box, media player, in-vehicle entertainment system, smartphone, server, device control system, a voice activated device, and so forth. The user device 108(1) may utilize automated speech recognition or other techniques to receive and analyze audible user inputs.

The user device 108(1) may include an interface 110(1). The interface 110(1) may be configured to present contact information 112(1). The contact information 112(1) may include the name of the user 102(2), the communication address, and so forth. For example, the contact information 112(1) may include John Doe, the temporary phone number 555-5555, and the extension number 123. The interface 110(1) may also be configured to present user controls for the call 114(1). The call user control 114(1) may be configured to receive a user input to initiate a communication to the user device 108(2).

The user device 108(1) may send communication data 116(1) to a server 118. The communication data 116(1) may include the communication address, shipment information, information corresponding to the delivery person 102(1), information corresponding to the user device 108(1) and so forth. For example, the communication data 116(1) may include the temporary phone number and the extension number.

The server 118 may include an application module 120, a communication module 122, and a recording module 124. The application module 120 may include data about the user 102(2) such as user name 126, extension number 128, which has been assigned to the shipment 104, phone number 130 of the user 102(2), and so forth. In other examples, the data may also include one or more parameters indicating user preferences, a shipment number, the temporary phone number and so forth. As illustrated in FIG. 1, the data associated with the user name 126 includes John Doe and Jane Doe. John Doe has an extension number 128 of 123 and Jane Doe has an extension number 128 of 456. The phone number 130 for John Doe is 451-4567 and for Jane Doe is 987-1234.

The application module 120 upon receipt of the communication data 116(1) may determine the user account associated with the extension number 128. For example, the application module 120 may determine that the extension number 123 is associated with a shipment number 456987 for a barbell weight set and that the user account is for John Doe. The application module 120 may determine that the user's phone number 130 is 451-4567. The application module 120 may access user communication parameters. The user communication parameters may indicate the type of communication a user 102(2) prefers, times of the day a user 102(2) is available, times of the day a user 102(2) is not available, days of the week the user 102(2) is available, days of the week the user 102(2) is not available, and so forth. For example, the user communication parameters may indicate that the user 102(2) prefers to be contacted first by a phone call and second by SMS messaging. The user communication parameters may indicate that the user 102(2) is only available Monday, Wednesday, and Friday between 3:00 pm through 5:00 pm. In addition, the user communication parameters may indicate that the user 102(2) is unavailable on national holidays. If the delivery person 102(1) attempts to contact the user 102(2) during a period of time that the user 102(2) is unavailable, the application module 120 may prevent connection with the user device 108(2). In other examples, the application module 120 may connect the delivery person 102(1) to communicate with a voice mailbox associated with the user device 108(2), rather than preventing connection with the user 102(2).

In other implementations, when the user 102(2) is unavailable, the user 102(2) may designate a proxy to receive communications during the times the user 102(2) is unavailable. The proxy may be a device that caches the received communication data 116(2). In other implementations, the proxy may be another user who acts on the behalf of the user 102(2). The system 100 or the user 102(2) may contact the proxy, via a different communication channel, to configure the proxy to receive the communication data 116(2) during times that the user 102(2) is unavailable. For example, the user 102(2) may use the user device 108(2) to contact the proxy. Upon contacting the proxy, the user device 108(2) may prompt the user 102(2) to input a passcode to use the proxy and activate the proxy to receive and cache the communication data 116(2). The proxy may continue to receive and cache the communication data 116(2) for a period of time designated by the user communication parameters, as described above. In other implementations, the proxy may continue to receive the communication data 116(2) until the user 102(2) contacts the proxy and configures the proxy to end the receiving of the communication data 116(2). For example, the user device 108(2) may contact the proxy and the user 102(2) may input the passcode which ends the session of the proxy receiving the communication data 116(2).

The application module 120 may send the user's phone number 130 to the communication module 122. The communication module 122 may send communication data 116(2) to the user device 108(2) to establish communication between the user device 108(1) and the user device 108(2). The communication data 116(2) may include information such as the delivery person's name, the business the delivery person 102(1) is associated with, the delivery person's phone number, and so forth. For example, the communication module 122 may initiate a call to the phone number 451-4567 to establish communication between the user device 108(1) and the user device 108(2). The user device 108(2) may include the interface 110(2). The interface 110(2) may be configured to present contact information 112(2). The contact information 112(2) may include the name of the delivery person 102(1), the business the delivery person 102(1) is associated with, the delivery person's phone number, and so forth. For example, the contact information 112(2) may include Delivery Person and phone number 666-6666. The interface 110(2) may also be configured to present an answer call user control 114(2). The answer call user control 114(2) may be configured to receive a user input to accept establishing communication with the user device 108(1). Upon establishing communication, the delivery person 102(1) may communicate with the user 102(2). For example, the delivery person 102(1) may ask the user 102(2) for directions to the user's residence or ask questions about what the user's residence looks like, such as color of the user's residence. The type of communication between the delivery person 102(1) and the user 102(2) may include a voice communication, a short message service (SMS) message, a multimedia messaging service (MMS), an instant message, a voice to SMS, a SMS to voice communication, a voice to MMS communication, an MMS to voice communication, a voice to instant message, an instant message to voice, electronic mail, and so forth.

For example, the communication between the delivery person 102(1) and the user 102(2) may be by voice. In this example, the delivery person 102(1) and the user 102(2) may talk to each other and hear what each other are saying. In another example, the communication between the delivery person 102(1) and the user 102(2) may be by SMS, MMS, or instant message. In this example, while the sending of data may be different for each of the types of communication, the delivery person 102(1) and the user 102(2) may exchange typed messaging between the user devices 108. In yet another example, the user 102(2) may have a preference for a particular type of communication, such as instant messaging. However, the delivery person 102(1) may be driving and unable to input a message to the user 102(2). The delivery person 102(1) may provide a voice message and the server 118 or communication module 122 may convert the voice message to a text message and send the text message to the user device 108(2). In other examples, the delivery person 102(1) may provide an instant message and the server 118 or the communication module 122 may convert the instant message to voice and send it to the user device 108(2).

In one implementation, the server 118 may provide a notification to the delivery person 102(1) and the user 102(2) prior to establishing the communication. The notification may indicate that the communication may be recorded. In other implementations, the server 118 may provide the notification and input controls to the delivery person 102(1) and the user 102(2). The input controls may be configured to enable the delivery person 102(1) or the user 102(2) to authorize or decline authorization to have the communication recorded.

The recording module 124 may, with the consent of both parties, generate session data 132 that includes the recording of the communication between the delivery person 102(1) and the user 102(2). Upon completion of the communication the recording module 124 may store the session data 132. The recording module 124 may generate first user review data based on the session data 132. The first user review data may include a first amount of time indicating a first duration of the communication between the first user device 108(1) and the second user device 108(2), type of communication between the first user device 108(1) and the second user device 108(2), first information indicating a reason for the communication, a second amount of time indicating a second duration from the stopping of the recording to the delivery of the item, a number of times the first user device 108(1) communicated with the second user device 108(2), second information indicating at least behavior of the delivery person 102(1) of the first user device 108(1), and so forth. For example, the recording module 124 generates first review user data that indicates that the delivery person 102(1) communicated with the user 102(2) for five (5) minutes, the type of communication was by voice, the reason for the communication was to obtain directions to deliver the shipment 104, that it took the delivery person 102(1) an additional ten (10) minutes after the communication ended to deliver the shipment 104, that the delivery person 102(1) contacted the user 102(2) twice, and that the delivery person's behavior during the first communication was friendly, polite, overall good natured, while during the second communication the delivery person 102(1) appeared rude and upset. The first user review data may be used to evaluate the delivery person 102(1). In other implementations, the first user review data may be provided to the business of the delivery person 102(1). The business may use the first user review data to provide feedback to the delivery person 102(1).

In one implementation, the delivery person 102(1) upon delivering the shipment 104 to the user 102(2) may provide a confirmation to the server 118. For example, the delivery person 102(1) may send a confirmation that indicates that the user 102(2) physically received the shipment 104. The server 118 upon receipt of the confirmation of the delivery may disassociate the communication address from the user account. For example, the server 118 may remove the association of the temporary phone number 130 and the extension number 128 from John Doe's user account. In this example, if the delivery person 102(1) or another user attempted to contact the user 102(2) through the use of the temporary phone number 130 and the extension number 128 they would not be able to contact the user 102(2) as the application module 120 would not be able to determine the phone number 130.

In another implementation, the delivery of the shipment 104 to the user 102(2) may include the server 118 determining that a period of time has expired from the delivery of the shipment 104. The expiration of the period of time may include a set number of minutes has elapsed, a set number of hours has elapsed, or a set number of days has elapsed. For example, the server 118 may remove the association of the temporary phone number 130 and the extension number 128 from John Doe's user account after ten (10) minutes have elapsed from the delivery of the shipment 104. Waiting for a period of time before removing the association allows the delivery person 102(1) to communicate with the user 102(2). For example, the delivery person 102(1) may communicate with the user 102(2) to indicate that the shipment 104 has been delivered. In another example, the delivery person 102(1) may communicate with the user 102(2) to indicate that the shipment 104 has been delivered to a different location then previously indicated. In this example, the user 102(2) may have indicated to leave the shipment 104 at a side entry of the user's residence. However, upon delivery of the shipment 104 the delivery person 102(1) may not be able to access the side entry. The delivery person 102(1) may deliver the shipment 104 to the front entry of the user's residence and communicate that change with the user 102(2).

In another implementation, the server 118 may receive data, from the user device 108(1) indicating that the shipment 104 has been delivered to an area associated with a shipping address of the shipment 104. The area may include a front door area associated with a user's residence, a receiving area associated with a business residence, a locker area that stores shipments, a vehicle associated with the user account, and so forth. The server 118 may provide a notification to the user device 108(2) that the shipment 104 is delivered to the area. For example, the server 118 may send an instant message or cause the user device 108(1) to provide a voice message indicating that the shipment 104 is located at the front door of the user's residence. The server 118 may receive an input command from the user 102(2) confirming receipt of the shipment 104. For example, the user device 108(2) may provide an input command for the user 102(2) to select that the shipment 104 has been received. The selection of the input may be a voice command from the user 102(2), a user input selecting the input command, and so forth. The server 118, as described above, may remove the association of the temporary phone number 130 and the extension number 128 from the user account.

In yet another implementation, the server 118 may receive image data indicating that the shipment 104 has been delivered. The image data may be sent from a sensor, another user device, camera, and so forth, that is located proximate to the location of where the shipment 104 was delivered. For example, the user's residence may have a doorbell that includes a camera. The camera may capture an image or video of the delivery person 102(1) delivering the shipment 104. The camera may send the image data to the server 118 or the camera may provide a notification to the user device 108(2) that the shipment 104 has been delivered. In one example, the server 118 may remove the association of the temporary phone number 130 and the extension number 128 from the user account upon receipt of the image data. In another example, the server 118 may provide a notification to the user device 108(2), as described above. The user device 108(2) may provide one or more user control input options to confirm the receipt of the shipment 104. The user device 108(2) may receive, as described above, an input command confirming receipt of the shipment 104. The user device 108(2) may send the selection to the server 118 and the server 118 may remove the association of the temporary phone number 130 and the extension number 128 from the user account, as described above.

In other implementations, the application module 120 may receive the communication data 116(1). The application module 120 may provide one or more input controls to the delivery person 102(1). The one or more input controls may be configured to enable the delivery person 102(1) to input via the user device 108(1) one or more commands. For example, the one or more input controls may be a list of options of inputs. The list of options of inputs may include that if the delivery person 102(1) knows the extension number 128 of the user 102(2) they are trying to communicate with the delivery person 102(1) will input a number, such as one (1), and then be prompted to input the extension number 128. The list of options of inputs may also include that if the delivery person 102(1) knows the shipment number to input another number, such as two (2) and then be prompted to input the shipment number. The list of options may also include that if the delivery person 102(1) knows the name or shipping address of the user 102(2) to input a different number, such as three (3), and then be prompted to input the user's name or shipping address. The list of options may also include that the delivery person 102(1) may input another number, such as four (4), and then be connected to a representative that may facilitate the establishing of a communication between the user device 108(1) and the user device 108(2). The input may be voice or a user input selecting an input displayed on the user device 108(1).

In another implementation, the server 118 may receive an item recall notification associated with an item in the shipment 104. For example, the server 118 may receive a recall notification indicating that the barbell from the barbell weightlifting set is defective. The application module 120 may determine a geographic location of where the shipment 104 was delivered. For example, the application module 120 may determine that the barbell weightlifting set was delivered to 12 Acorn Drive, Red Pine, Tex. 12345, which is located in the United States. The application module 120 may assign a communication address associated with the shipment 104. For example, the application module 120 may assigned temporary phone number 555-5555 with extension number 999 with the shipment 104 and the item recall notification. The application module 120 may generate item recall notification data that includes the item recall notification and the communication address. For example, the application module 120 may generate item recall notification data that includes that the barbell is defective and that the temporary number is 555-5555 with extension number 999. The communication module 122 may send the item recall notification data to an item recall notification service. The item recall notification service may use the communication address to contact the user to inform them of the item recall. By using the communication address the security is improved by protecting user information, such as the user's phone number from employees of the item recall notification service.

Figure 2:
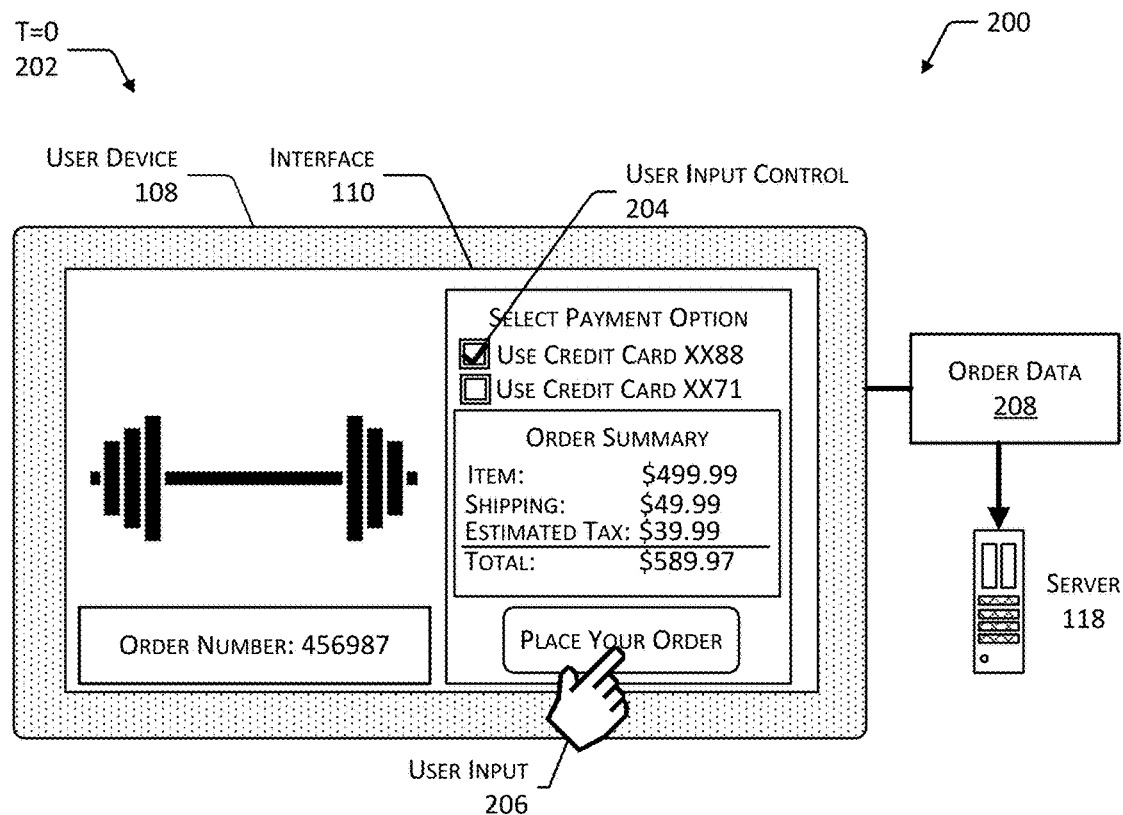
FIGS. 2-4 describe a scenario for protecting user information that is associated with a shipment, according to one implementation.
Figure 2:
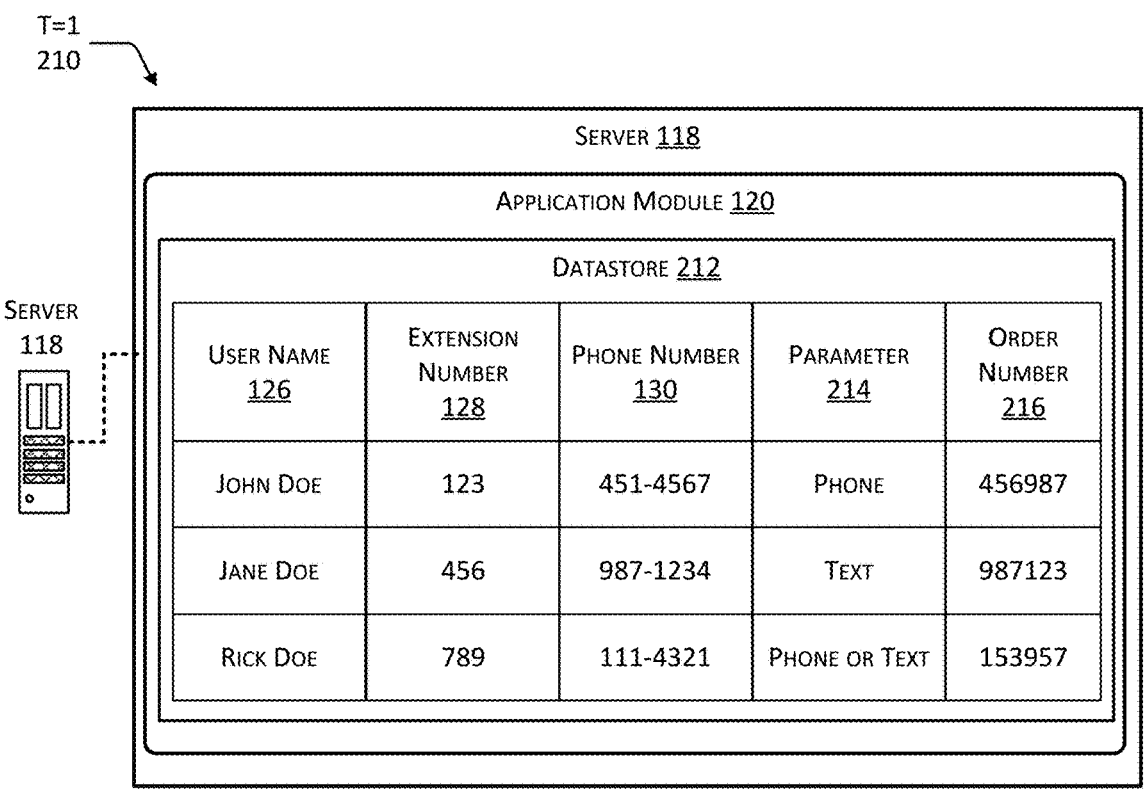

FIG. 2 is an example 200 for protecting user information that is associated with a shipment 104, according to one implementation. At (T=0) 202 the user device 108 may include the interface 110. The interface 110 may display an item, such as a barbell weight set that the user 102(2) intends to order. The interface 110 may be configured to display a user input control 204 to select a payment option. For example, the payment options may include one or more bank accounts, one or more credit cards, one or more gifts cards, and so forth. Next to each option the interface 110 may display the user input control 204, such as a check box input control, configured to enable a user 102(2) to select a particular payment option. The interface 110 may display an order summary. The order summary may include the cost of the item, shipping costs, estimated tax, total cost, and so forth. For example, the cost for an item may be $499.99, with a shipping cost of $49.99, and estimated tax of $39.99. The total cost to purchase the eligible item may be $589.97. In this example, the user 102(2) may select the user input control to use a credit card ending in XX88 to purchase the item. The interface 110 may display a user input control 204 configured to receive the user input 206 to place the order for the item. The interface 110 may be configured to display an order number. For example, the interface 110 may display order number 456987 associated with the purchase of the item. The user device 108 may send order data 208 to the server 118. The order data 208 may include information identifying the ordered item, the order number, selected payment option, user account information, shipping address, shipment method, and so forth.

In one implementation, at (T=1) 210, the application module 120 may determine the user account and the shipping address associated with the order. The application module 120 may determine the user account and the shipping address based on the order data 208. For example, the application module 120 may determine that the user account may be associated with John Doe and that the shipping address for the shipment 104 may be 12 Acorn Drive, Red Pine, Tex. 12345. The application module 120 may determine a geographic location based on the shipping address. For example, the application module 120 may determine that the geographic location is the United States. The application module 120 may associate a communication address for each individual order or shipment 104 based on the determined geographic location. For example, the user 102(2) may have placed multiple orders over several days or may be receiving multiple shipments 104 from different users 102. The application module 120 for each of these orders or shipments 104 may associate a separate communication address. For example, order number 456987 may have a communication address with an extension number 128 of 123, while the shipment number 987888 may have a communication address of extension number 777. The communication address, as described above, may include a temporary phone number 130, a username, a network address, and so forth. The temporary phone number 130 may be a phone number with any number of digits. For example, in North America, the temporary phone number 130 may comprise a phone number with an extension number, a phone number and a shipment number, and so forth. For example, the application module 120 may associate a communication address of 555-5555 based on the shipping address being in the United States. In another example, the application module 120 may associate a communication address of 123-456-7890 with a two-digit country specific code to be entered prior to inputting the communication address. The application module 120 may associate the communication address with the order data 208. The application module 120 may store the association in a datastore 212. The datastore 212 may include data information about the user 102(2) such as the user name 126, the extension number 128 which has been assigned to the shipment 104, phone number 130 of the user 102(2), parameters 214 as set by one or more user preferences, order number 216, and so forth. The data information may also include other information such as the communication address, temporary phone number, network address, username, notes about the user 102(2), user rating, and so forth.

The system may operate using one or more different communication modalities. The modalities may include, but are not limited to, voice, video, text, avatars, telepresence devices, and so forth. For example, the system may utilize telephone calls placed using a public switched telephone number (PSTN), telephone calls placed using voice over internet protocol (VOIP), audio sent via a network to one or more voice enabled devices, and so forth. While a telephone number 130, extension, network address, user name 126, and so forth are described as being used to establish communication between two or more parties, it is understood that other identifiers or designators may be used to establish communication. For example, a voice enabled device may receive an audio command such as "call shipment Bravo Charlie Echo", with the particular combination of words, rather than a string of digits, being used to designate the destination or endpoint of that communication.

As illustrated in FIG. 2, the data associated with the user name 126 includes John Doe, Jane Doe, and Rick Doe. John Doe has an extension number of 123, Jane Doe has an extension number of 456, and Rick Doe has an extension number of 789. The phone number 130 for John Doe may be 451-4567, for Jane Doe may be 987-1234, and for Rick Doe may be 111-4321. The parameter 214 for John Doe may include that the preferred communication type be a phone call, for Jane Doe may include that the preferred communication type be by text, and that for Rick Doe may include a phone call or text. The parameter 214 may additionally include times of the day a user 102(2) is available, times of the day a user 102(2) is not available, days of the week the user 102(2) is available, days of the week the user 102(2) is not available, and so forth. For example, the parameter 214 may indicate that John Doe's second preferred communication type is by SMS messaging, that he is available on Monday, Wednesday, and Friday between 3:00 pm through 5:00 pm. In addition, the parameter 214 may indicate that the user 102(2) is unavailable on national holidays.

The application module 120 may generate shipping information that includes the communication address. For example, the shipping information may be a shipping label 106 that includes the user's name, such as John Doe, the shipping address, such as 12 Acorn Drive, Red Pine, Tex. 12345, and the communication address, such as temporary phone number 555-5555, extension number 123.

Figure 3:
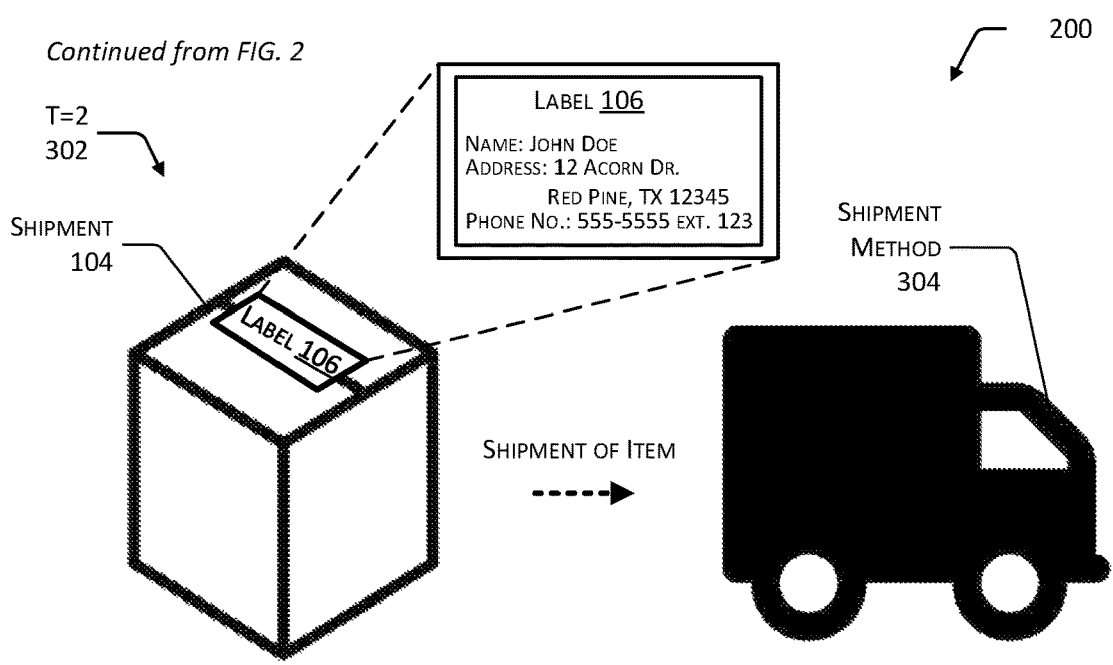
Figure 3:
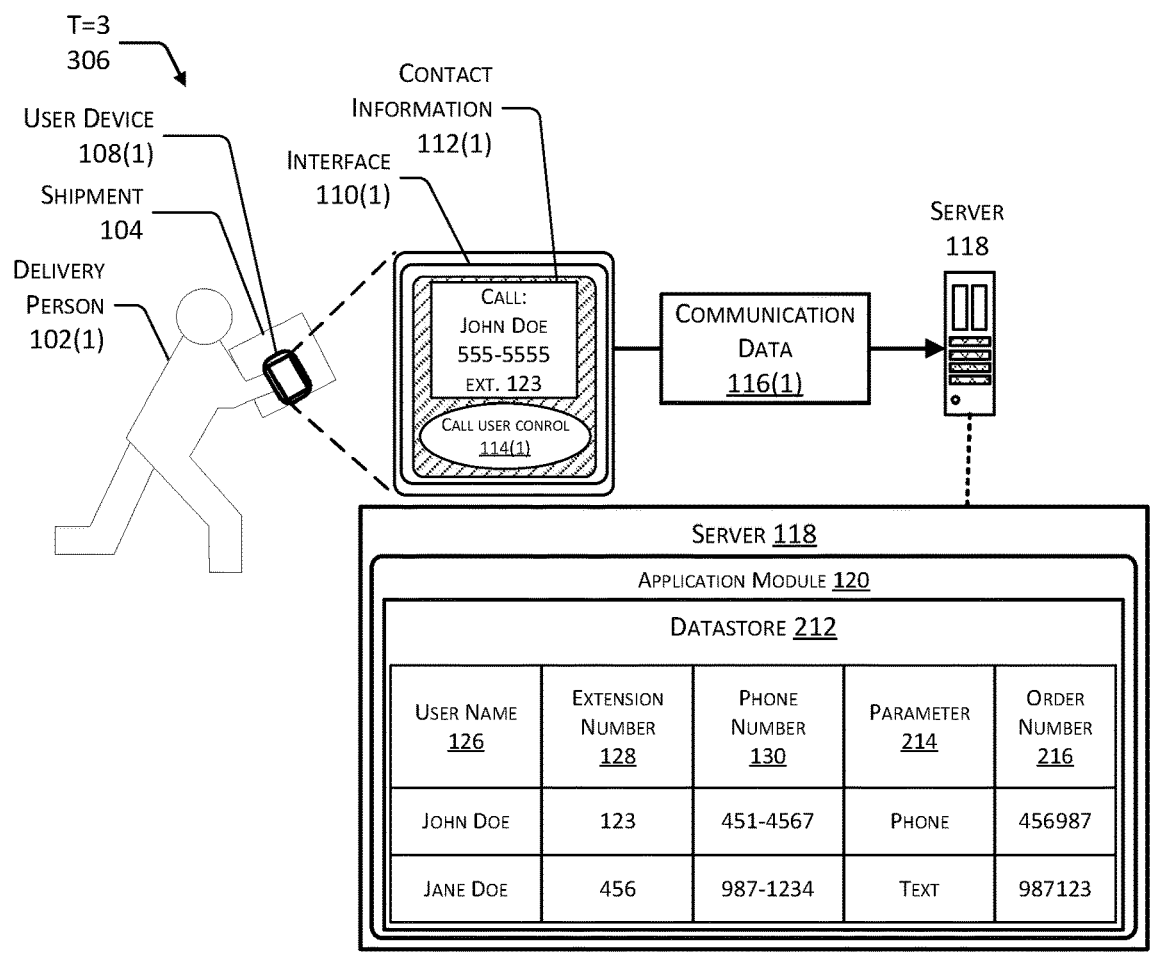

FIG. 3 depicts the continuation of the example 200 from FIG. 2 of protecting user information that is associated with a shipment 104, according to one implementation. In this example, at (T=2) 302, the shipment 104 may be prepared to be shipped by a shipment method 304. The shipment 104 may include the label 106. The label 106 may include shipping information. For example, the label 106 may include the user's name, such as John Doe, the shipping address, such as 12 Acorn Drive, Red Pine, Tex. 12345, and the communication address, such as temporary phone number 555-5555, extension number 123. In another example, the shipping information may include the identification number, such as the order number, RFID tag number, optical tag or barcode number, and so forth. In this example, the label 106 may not display any user information. Rather, the label 106 may include an RFID tag number or optical tag. The shipment method 304 may include semi-trailer truck, rail cars, boat, other shipment vehicles, and so forth.

At (T=3) 306, the delivery person 102(1) may need to contact the user 102(2). For example, the delivery person 102(1) may not be able to complete delivery of the shipment 104 due to a delivery issue. The delivery issue may be an incorrect, inaccurate, or confusing address, a passcode to enter the user's residence or apartment building, delay in the delivery, and so forth. The delivery person 102(1) may call the temporary phone number 130 and extension number 128 using user device 108(1). The user device 108(1) may be a television, tablet computer, personal computer, electronic book reader, gaming console, set-top box, media player, in-vehicle entertainment system, smartphone, server, device control system, a voice activated device, and so forth. The user device 108 may utilize automated speech recognition or other techniques to receive and analyze audible user inputs.

The user device 108(1) may include the interface 110(1). The interface 110(1) may be configured to present contact information 112(1). The contact information 112(1) may include the name of the user 102(2), the communication address, and so forth. For example, the user information 112(2) may include John Doe, the temporary phone number 555-5555, and the extension number 123. The interface 110(1) may also be configured to present a call user control 114(1). The call user control 114(1) may be configured to receive a user input to initiate a communication to the user device 108(2). For example, activating the call user control 114(1) may initiate the call.

The user device 108(1) may send the communication data 116(1) to the server 118. The communication data 116(1) may include the communication address, shipment information, information corresponding to the delivery person 102 (1), information corresponding to the user device 108(1) and so forth. For example, the communication data 116(1) may include the temporary phone number 130 and the extension number 128, as described above.

In another implementation, the label 106 may include an RFID tag number or optical tag. The delivery person 102(1) may capture an image of the RFID tag number or optical tag using the user device 108(1). For example, the delivery person 102(1) may use the camera on the user device 108(1) to scan, read, take a picture of, and so forth, the optical tag. The optical tag, such as a barcode, may include information that enables the server 118 to determine such information as, order number, user account, extension number 128, the user's phone number 130, and so forth. The user device 108(1) may send the communication data 116(1) to the server 118.

In some implementations the delivery person 102(1) may provide other information in order to establish communication. For example, it is possible that an outside party not authorized to participate in the use of the system may attempt to dial the temporary phone number 130 and attempt different extension numbers 128 in the hope of connecting to the user 102(2). In some implementations the server 118 may require entry of additional information to establish the communication. For example, the delivery person 102(1) may need to input at least a part of the information that is present on the label 106 or on the box containing the item. Continuing the example, the delivery person 102(1) may need to enter a house number, zip code, a portion of a shipment number, and so forth. This input may then be compared to data maintained in the datastore 212. If there is a match or other permissible correspondence, the communication may be allowed to proceed. Returning to the earlier example, this additional input would significantly limit the likelihood that the unauthorized outside party who does not have access to the item would be able to communicate with the user 102(2). In some implementations the extension number 128 may comprise a concatenation of a first number and a zipcode or other delivery information associated with the shipment 104. In other implementations the delivery person 102(1) may need to input data that is associated with that particular delivery person 102(1), their employer, and so forth. For example, a company that employs the delivery person 102(1) may be issued a company identification code. The delivery person 102(1) may be required to enter a valid company identification code to establish communication.

Figure 4:
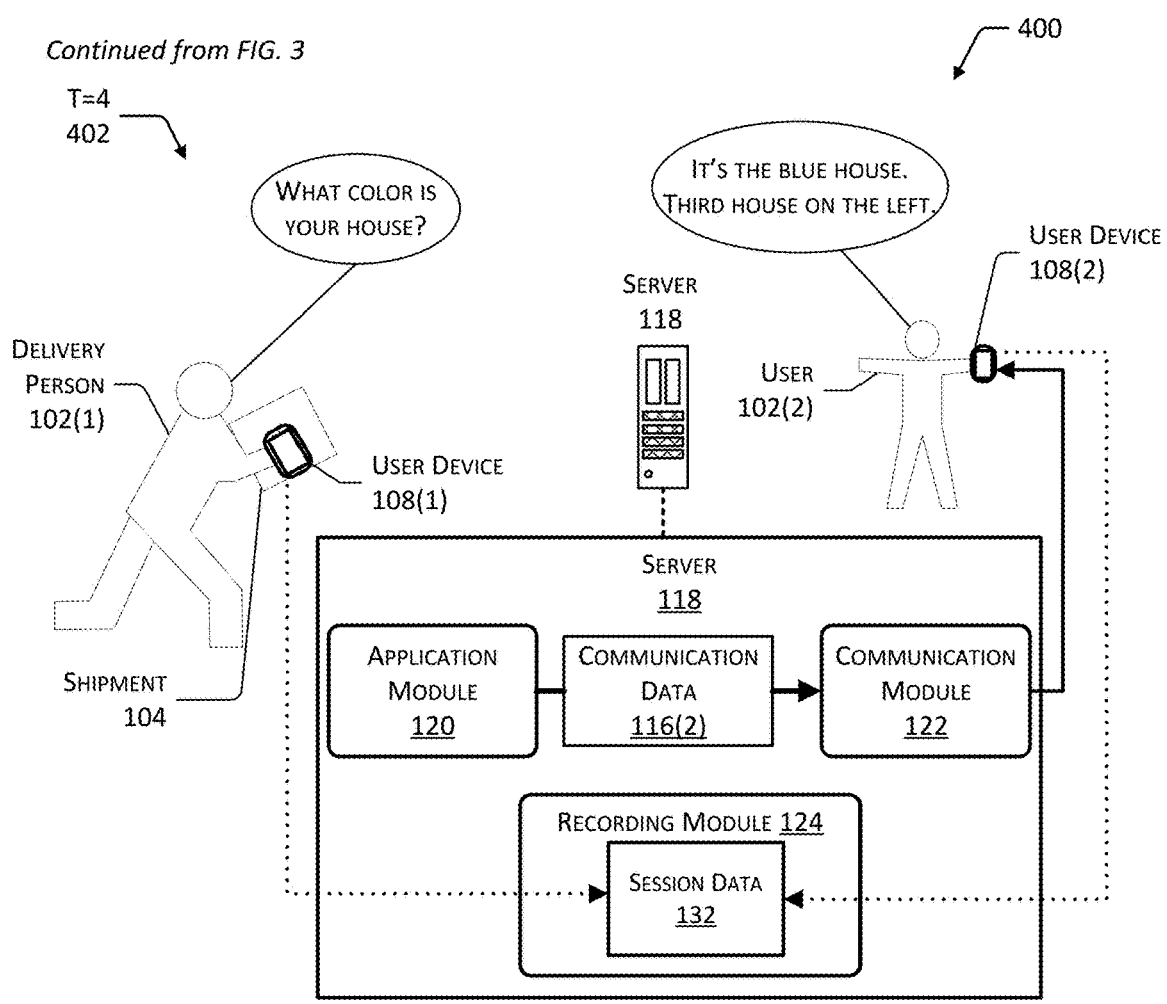
Figure 4:
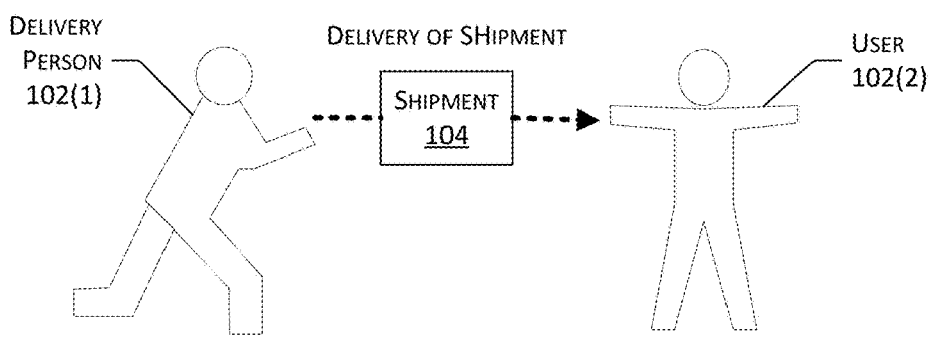

FIG. 4 depicts the continuation of the example 200 from FIG. 3 of protecting 102(2) information that is associated with a shipment 104, according to one implementation. In this example, at (T=4) 402, the application module 120, upon receipt of the communication data 116(1), may determine the user account associated with the extension number 128. For example, the application module 120 may determine that the communication address is associated with a shipment number 456987 for a barbell weight set and that the user account is for John Doe. The application module 120 may determine that the user's phone number is 451-4567. The application module 120 may access user communication parameters 214. The user communication parameters 214 may indicate the type of communication a user 102(2) prefers, times of the day a user 102(2) is available, times of the day a user 102(2) is not available, days of the week the 102(2) is available, days of the week the user 102(2) is not available, and so forth. For example, the user communication parameters 214 may indicate that the user 102(2) prefers to be contacted first by a phone call and second by SMS messaging. The user communication parameters 214 may indicate that the user is only available Monday, Wednesday, and Friday between 3:00 pm through 5:00 pm. In addition, the user communication parameters 214 may indicate that the user 102(2) is unavailable on national holidays. If the delivery person 102(1) attempts to contact the user 102(2) during a period of time that the user 102(2) is unavailable, the application module 120 may prevent connection with the user device 108(2). In other examples, the application module 120 may connect the delivery person 102(1) to communicate with a voice mailbox associated with the user device 108(2), rather than preventing connection with the user 102(2).

The application module 120 may send the communication data 116(2) that includes the user's phone number 130 to the communication module 122. The communication module 122 may establish communication between the user device 108(1) and the user device 108(2). The communication module 122 may provide a notification to the delivery person 102(1) and the user 102(2) prior to establishing the communication. The notification may indicate that the communication may be recorded with the consent of both parties. In other implementations, the communication module 122 may provide the notification and input controls to the delivery person 102(1) and the user 102(2). The input controls may be configured to enable the delivery person 102(1) or the user 102(2) to authorize or decline authorization to have the communication recorded.

The recording module 124, as described above, may generate the session data 132 that is the recording, with the consent of both parties, of the communication between the delivery person 102(1) and the user 102(2). Upon completion of the communication the recording module 124 may store the session data 132. The recording module 124 may generate first user review data based on the session data 132, as described above. The first user review data may be used to evaluate the delivery person 102(1). In other implementations, the first user review data may be provided to the business of the delivery person 102(1). The business may use the first user review data to provide feedback, further training, and so forth, to the delivery person 102(1).

In other implementations, the application module 120 may receive the communication data 116(1). The application module 120 may provide one or more input controls to the delivery person 102(1). The one or more input controls may be configured to enable the delivery person 102(1) to input via the user device 108(1) one or more commands. For example, the one or more input controls may be a list of options of inputs. The list of options of inputs may include that if the delivery person 102(1) knows the extension number of the user 102(2) they are trying to communicate with to input a number, such as one (1), and then be prompted to input the extension number 128. The list of options of inputs may also include that if the delivery person 102(1) knows the shipment number to input another number, such as two (2) and then be prompted to input the shipment number. The list of options may also include that if the delivery person 102(1) knows the name or shipping address of the user 102(2) to input a different number, such as three (3), and then be prompted to input the user's name or shipping address. The list of options may also include that the delivery person 102(1) may input another number, such as four (4), and then be connected to a representative that may facilitate the establishing of a communication between the user device 108(1) and the user device 108(2). The input may be voice or a user input selecting an input displayed on the user device 108(1). The application module 120, upon receiving an input, may establish the communication between the user device 108(1) and the user device 108(2).

In another implementation, the application module 120 may, upon receipt of the communication data 116(1), establish communication between the user device 108(1) and the user device 108(2). The application module 120 may establish the communication based on associating the user's phone number with the communication address. For example, the application module 120 may associate the user's phone number 451-4567 with the communication address so that when the communication address is used the communication between the user device 108(1) and 108(2) occurs automatically.

At (T=5) 404, the delivery person 102(1) may deliver the shipment 104 to the user 102(2). The delivery person 102(1) may deliver the shipment 104 to an area associated with a shipping address of the shipment 104. The area may include a front door area associated with a user's residence, a receiving area associated with a business residence, a locker area that stores shipments 104, a vehicle associated with the user account, and so forth. For example, the shipping address may indicate to have the shipment 104 delivered to a vehicle associated with the user account. The shipping address may include a location where the vehicle is located, description of the vehicle, such as vehicle make and model, color of the vehicle, license plate number, and so forth. The shipping address may also include instructions for how the delivery person 102(1) may access the vehicle to deliver the shipment 104. In other examples, the delivery person 102(1) may deliver the shipment 104 to a user's residence, as described above.

The delivery person 102(1), upon delivering the shipment 104 to the user 102(2) may provide a confirmation to the server 118. For example, the delivery person 102(1) may send a confirmation that indicates that the user 102(2) physically received the shipment 104. The server 118, upon receipt of the confirmation, may remove the association of the communication address from the user account, as described above. In other implementations, the server 118 may remove the association of the communication address from the user account after a period of time has expired, received user input confirming receipt, and so forth, as described above.

In some situations, the user 102(2) who is associated with the delivery of the shipment 104 may be unavailable. For example, the user 102(2) may not be able to answer a telephone call or respond to a text message. During the attempt to establish communication, the server 118 may provide to the user device 108(2) information about the origin of the communication, such as caller identification (ID) data, a network address, user name, and so forth. This information may direct the communication back to the server 118 and utilize a temporary phone number 130, network address, user name 126, and so forth. If the user 102(2) attempts to return the communication, the server 118 would then attempt to establish communication with the user device 108(1) associated with that temporary phone number 130. If the communication is not completed, such as if the delivery person 102(1) does not answer their phone, the server 118 may record an audio message, use automated speech recognition (ASR) to generate a text message from the audio message and send to the user device 108(1), or perform other functions. By utilizing the server 118 to facilitate communication, the actual telephone number, network address, user name, and so forth may remain private from the delivery person 102(1). For example, the callback by the user 102(2) may be presented on the user device 108(1) as coming from the temporary phone number 130, indicate a particular order number, indicate a number for the system, and so forth. In some implementations, the server 118 may maintain state information about missed communications and provide the delivery person 102(1) with a user interface 110, such as a menu on an application, an interactive voice response set of options, and so forth, to facilitate communication. For example, the server 118 may prompt the delivery person 102(1) that calls the server 118 with "please press 1 to speak to Beth or 2 to speak with Rick".

Figure 5:
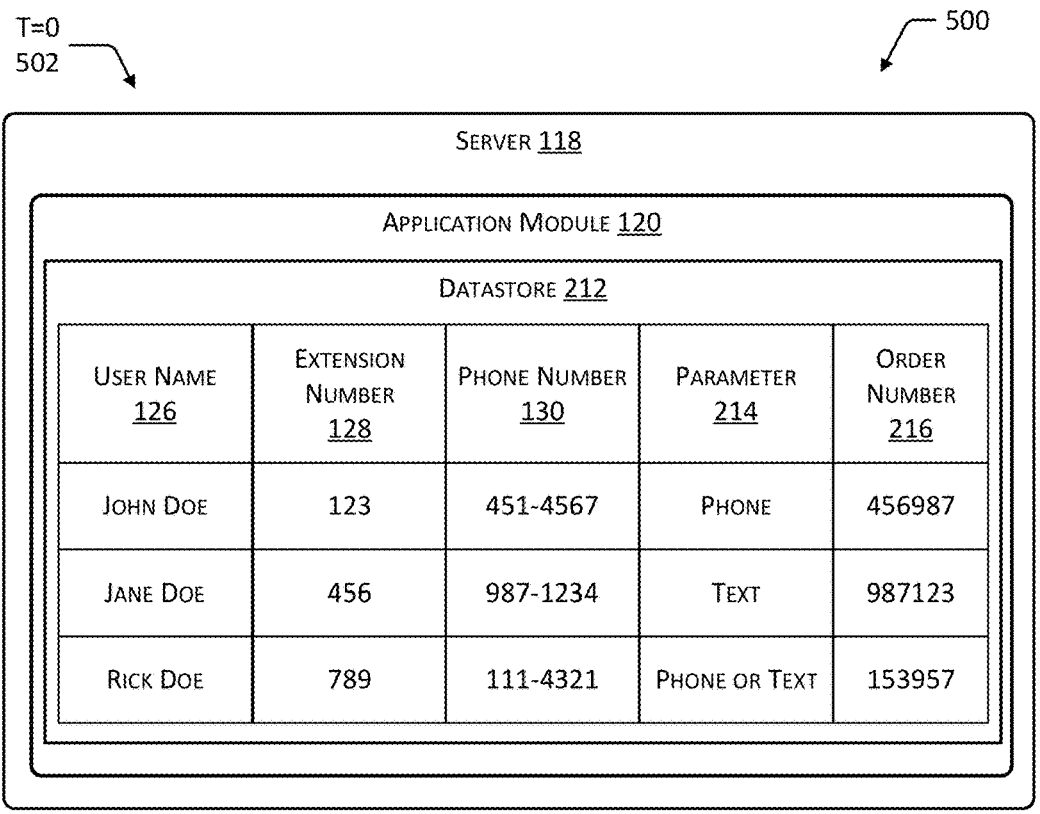
FIG. 5 illustrates block diagrams of a datastore for storing and removing temporary extension numbers associated with a user's account.
Figure 5:
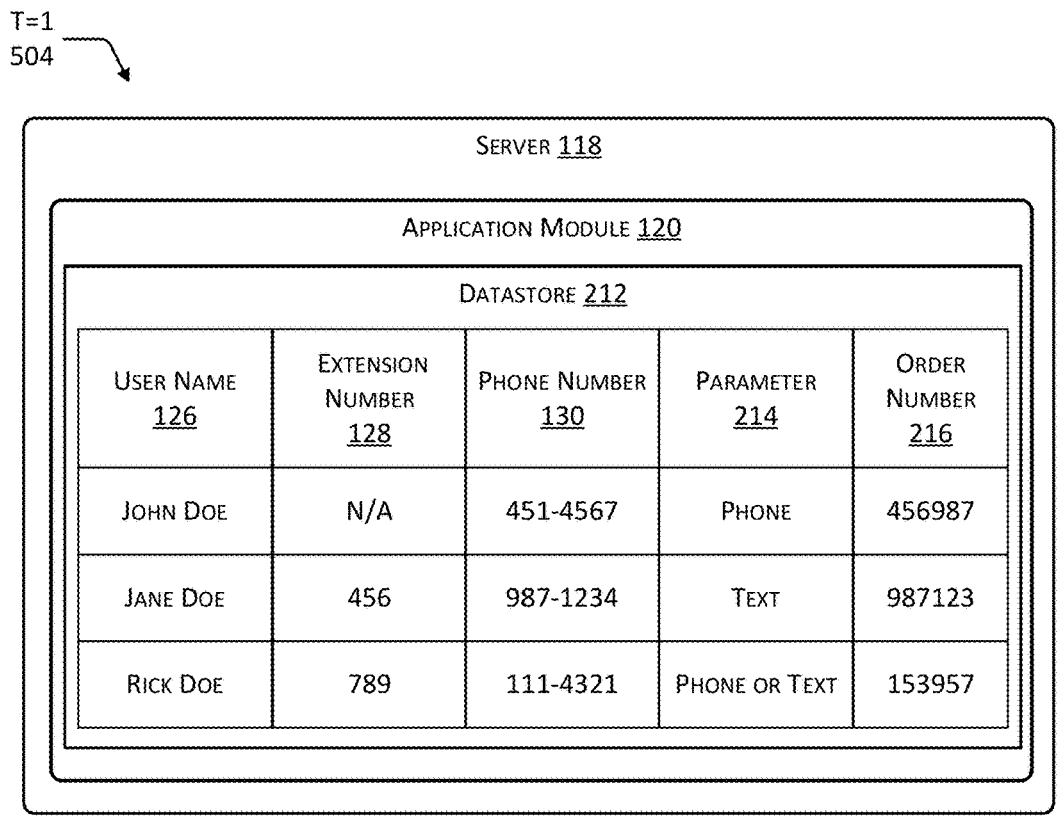

FIG. 5 is an example 500 of a datastore 212 for storing and removing a communication address associated with a user's account. At (T=0) 502, the server 118 may receive information indicating a shipment 104. The shipment 104 may be an order placed by the user 102(2), a gift sent to the user 102(2), information sent to the user 102(2), and so forth. For example, the user 102(2) may place an order for an item, such as a barbell weight set. In another example, a relative, friend, colleague, and so forth, may send an item to the user 102(2), such as clothes.

The application module 120 may determine the user account and the shipping address associated with the shipment 104, as described above. For example, the application module 120 may determine that the user account may be associated with John Doe and that the shipping address for the shipment 104 may be 12 Acorn Drive, Red Pine, Tex. 12345. The application module 120 may determine a geographic location based on the shipping address. For example, the application module 120 may determine that the geographic location is the United States. The application module 120 may associated a communication address based on the determined geographic location. The communication address, as described above, may include a temporary phone number 130, a username, a network address, and so forth. The temporary phone number 130 may be a ten-digit phone number, a seven-digit phone number and an extension number 128, a ten-digit phone number and a shipment number, a seven-digit phone number and the shipment number, and so forth. For example, the application module 120 may associate a communication address of 555-5555 based on the shipping address being in the United States. In another example, the application module 120 may associate a communication address of 123-456-7890 with a two-digit country specific code to be entered prior to inputting the communication address. The application module 120 may associate the communication address with the shipment 104. The application module 120 may store the association in the datastore 212. The datastore 212 may include data about the user 102(2) such as the user name 126, the extension number 128 which has been assigned to the shipment 104, phone number 130 of the user, parameters 214 as set by one or more user preferences, order number 216, and so forth. The data may also include other information such as the communication address, temporary phone number 130, network address, user name 126, notes about the user 102(2), user rating and so forth.

As illustrated in FIG. 5, the data associated with the username 126 includes John Doe, Jane Doe, and Rick Doe. John Doe has an extension number of 123, Jane Doe has an extension number of 456, and Rick Doe has an extension number of 789. The phone number 130 for John Doe may be 451-4567, for Jane Doe may be 987-1234, and for Rick Doe may be 111-4321. The parameter 214 for John Doe may include that the preferred communication type be a phone call, for Jane Doe may include that the preferred communication type be by text, and that for Rick Doe may include a phone call or text. The parameter 214 may additionally include times of the day a user 102(2) is available, times of the day a user 102(2) is not available, days of the week the user 102(2) is available, days of the week the user 102(2) is not available, and so forth. For example, the parameter 214 may indicate that John Doe's second preferred communication type is by SMS messaging, that he is available on Monday, Wednesday, and Friday between 3:00 pm through 5:00 pm. In addition, the parameter 214 may indicate that the user 102(2) is unavailable on national holidays.

By using the techniques and systems described above, for example the user communication parameters 214, network traffic is reduced. The network traffic is reduced because the delivery person 102(1) attempts to contact the user 102(2) during times that the user 102(2) has indicated they are available. For example, the user communication parameters 214 may indicate that the user 102(2) prefers to be contacted first by a phone call and second by SMS messaging. The user communication parameters 214 may indicate that the user 102(2) is only available Monday, Wednesday, and Friday between 3:00 pm through 5:00 pm. Since the delivery person 102(1) knows that the user 102(2) is only available on Monday, Wednesday, and Friday between 3:00 pm through 5:00 pm, the delivery person 102(1) only attempts to contact the user 102(2) during this time. By only attempting to contact the user 102(2) during these times, overall network traffic is reduced because the delivery person 102(1) is not attempting to contact the user numerous random times. Rather, the delivery person 102(1) is attempting to contact the user 102(2) during particular times as indicated by the user 102(2).

At (T=1) 504 the application module 120 may receive a confirmation that the shipment 104 has been delivered, as described above. The application module 120 may remove the association of the communication address from the user account. For example, the application module 120 may remove the association of the extension number 123 from John Doe's user account for the order number 456987. In other implementations, the application module 120 may remove the association of the communication address from the user account after a period of time has expired, as described above.

Figure 6:
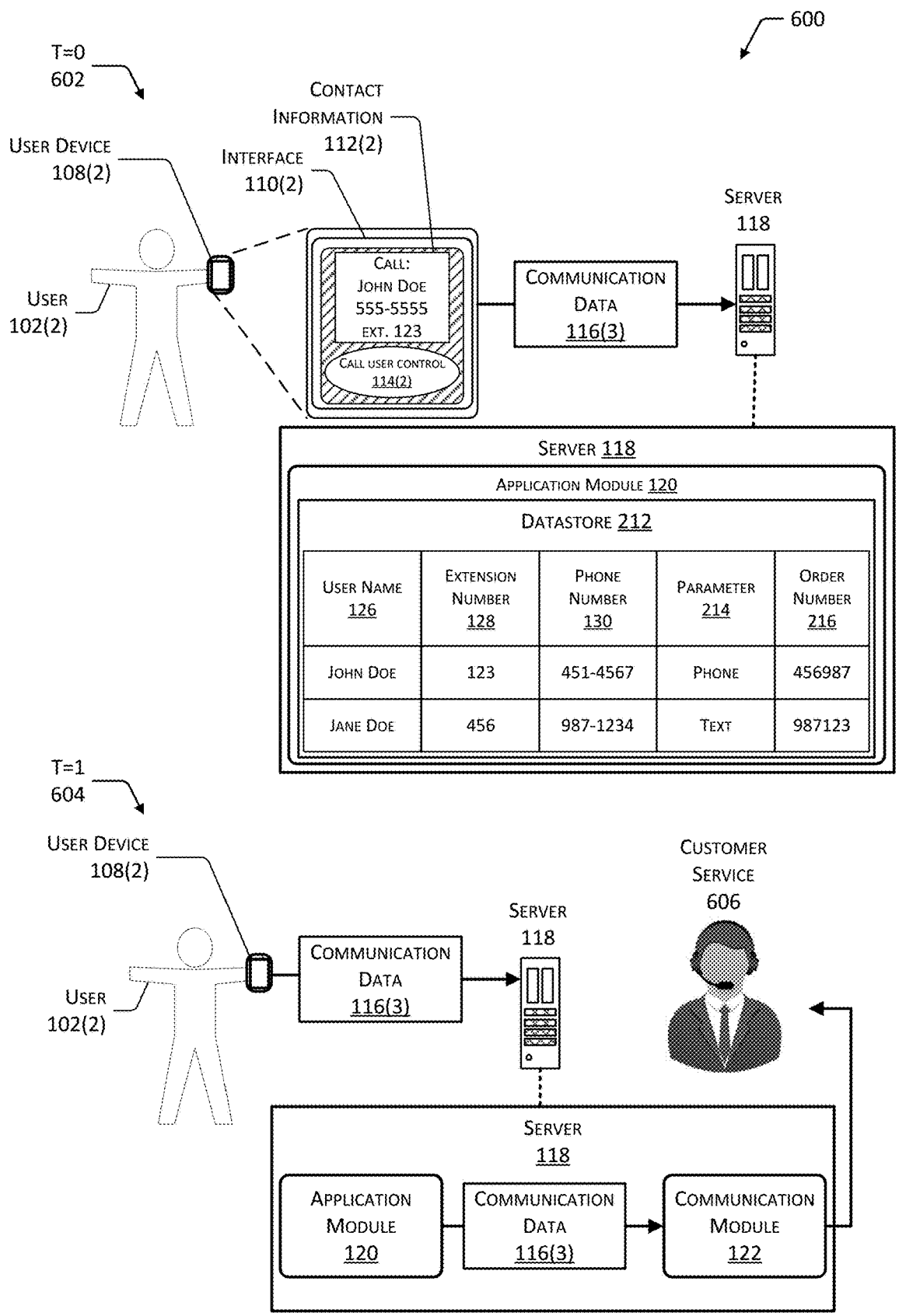
FIG. 6 illustrates block diagrams of a user contacting customer service through the use of the temporary extension number associated with the user's account.

FIG. 6 is an example 600 of a user 102(2) contacting customer service through the use of the communication address associated with the user's account. At (T=0) 602, the user 102(2) may input the communication address into the user device 108(2). The user device 108(2) may include the interface 110(2). The interface 110(2) may be configured to present contact information 112(2). The contact information 112(2) may include the name of the user 102(2), the communication address, and so forth. For example, the user information 112(2) may include John Doe, the temporary phone number 555-5555, and the extension number 123. The interface 110(2) may also be configured to present a call user control 114(2). The call user control 114(2) may be configured to receive a user input to initiate a communication.

The user device 108(2) may send communication data 116(3) to the server 118. The communication data 116(3) may include the communication address, shipment information, user account information, and so forth. For example, the communication data 116(3) may include the temporary phone number 130 and the extension number 128.

The application module 120 may determine that the communication was initiated through the use of the communication address. For example, the application module 120 may determine, based on the communication data 116(3) that the user device 108(2) used the temporary phone number 555-5555 with the extension number 123. The application module 120 may determine that the user device 108(2) that sent the communication data 116(3) is the user device 108(2) that is associated with the phone number 451-4567. The application module 120 may determine that the user 102(2) is not attempting to contact themselves but rather another party, such as customer service.

At (T=1) 604, the communication module 122 may establish communication between the user device 108(2) and a third user device 108(3). For example, the communication module 122 may establish communication between the user device 108(2) and customer service 606. The user 102(2) may initiate the process of returning an item within the shipment 104. In other implementations, the communication module 122 may connect the user device 108(2) to an interactive voice response (IVR) system to initiate the process of returning the ordered item. The IVR system may include one or more input controls. For example, the one or more input controls may be a list of options of inputs. The list of options of inputs may include that if the user 102(2) would like to return an item within the shipment 104 to input a number, such as one (1). The list of options of inputs may also include that if the user 102(2) would like to provide information about their experience with the delivery person 102(1) to input another number, such as two (2). The list of options may also include that if the user 102(2) would like to communicate with a customer service representative to input another number, such as eight (8).

In other implementations, the communication between the user 102(2) and customer service 606 may be recorded, with the consent of both parties, by the recording module 124, as described above. As described above, the recording module 124 may provide a notification to the user 102(2) prior to establishing the communication. The notification may indicate that the communication may be recorded.

Figure 7:
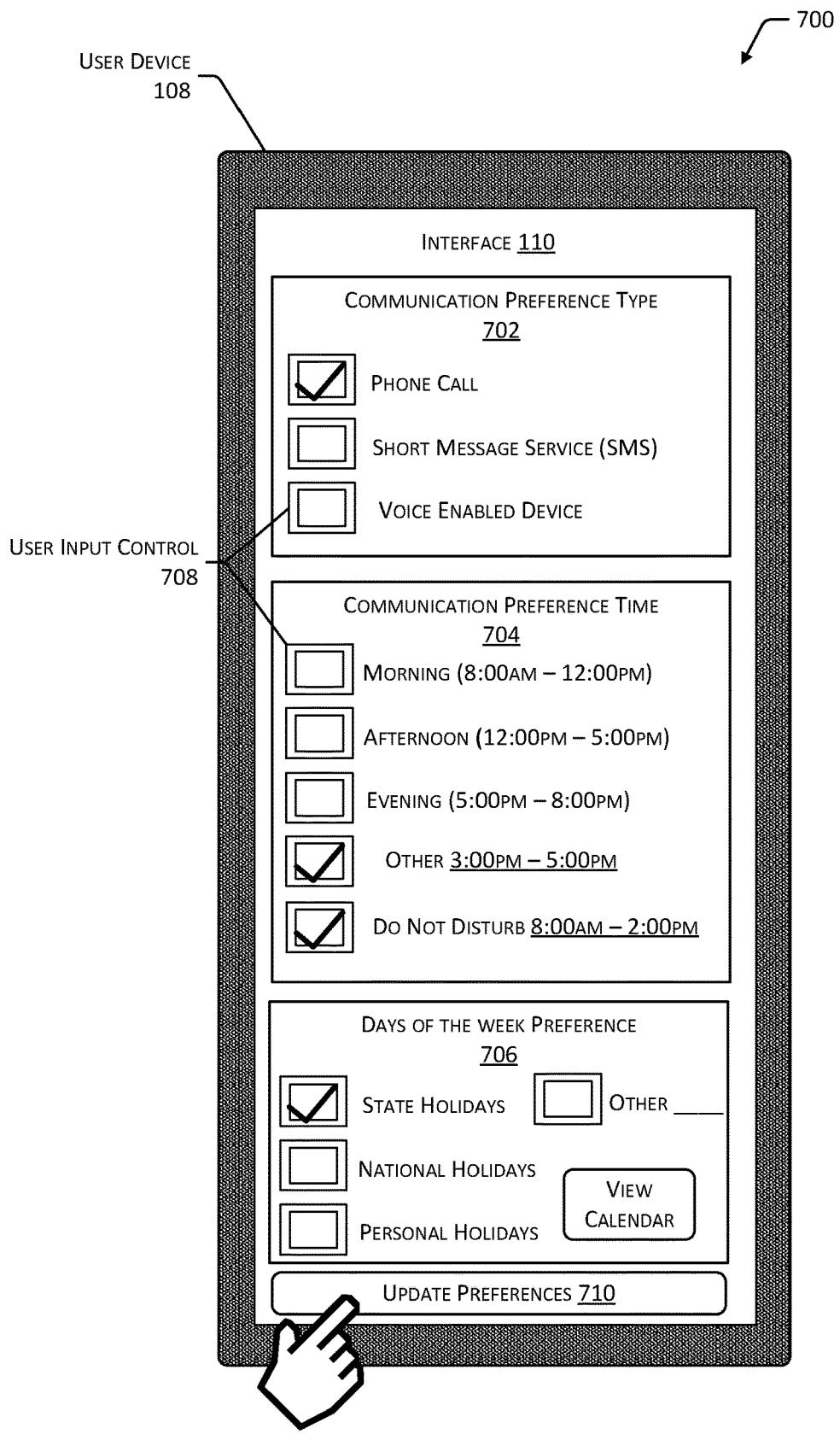
FIG. 7 is an example of a user interface for setting one or more user parameters.

FIG. 7 is an example 700 of a user interface 110 for setting one or more user parameters 214. The user device 108 may include the interface 110. The interface 110 may be configured to display one or more user preference types. The one or more preference types may include communication preference type 702, communication preference time 704, days of the week preference 706, and so forth. The one or more preference types may include a user input control 708. The user input control 708 may be configured to enable a user 102 to select one or more controls.

The communication preference type 702 may include a list of communication types that the user 102(2) may select from. The list of communication types may include a voice communication via telephone or a voice enabled device, a short message service (SMS) message, a multimedia messaging service (MMS), an instant message, a voice to SMS, an SMS to voice communication, a voice to MMS communication, an MMS to voice communication, a voice to instant message, an instant message to voice, electronic mail, and so forth. For example, the user 102(2) may select that they prefer phone calls. In another example, the user 102(2) may select that they prefer communication using a voice enabled device, such as a network connected device with a speaker and microphone. In other examples, the user 102(2) may select multiple types. For example, the user 102(2) may select voice communication and instant message. The user 102(2) may also set a preference when multiple types are selected. Continuing the above example, the user 102(2) may prefer to be contacted first by voice and then by instant message.

The communication preference time 704 may list a period of time the user 102(2) indicates they may prefer to be contacted. For example, the communication preference time 704 may display a list including morning (8:00 am-12:00 pm), afternoon, (12:00 pm-5:00 pm), evening (5:00 pm-8:00 pm), other, and so forth. The other option may be configured to enable a user 102(2) to personally select a period of time they are available. For example, as illustrated in FIG. 7, the user 102(2) may select other and set the period of time to be between 3:00 pm-5:00 pm. In other implementations, the communication preference time 704 may display a user input control for selecting an option to define a period of time during which the user 102(2) is unavailable. For example, as illustrated in FIG. 7, the user 102(2) may set the period of time to not be disturbed from 8:00 am-2:00 pm. The communication preference time 704 may also be configured to enable the user 102(2) to select the predefined periods of time for morning, afternoon, and evening as the period of time the user 102(2) is unavailable.

The days of the week preference 706 may display a list of days, state holidays, national holidays, personal holidays, view calendar option to manually select days, and so forth. For example, as illustrated in FIG. 7 the user 102(2) may select that they are unavailable on state holidays. In other examples, the user 102(2) may select from the list of options for when they are available and unavailable. For example, the user 102(2) may select that they are available on Monday, Wednesday, and Friday and unavailable on national holidays.

The interface 110 may display a selection to update preferences 710. The update preferences 710 may be configured to receive a user input to set the selected user input controls 708 as the user's preferences for communication type, time, and week.

Figure 8:
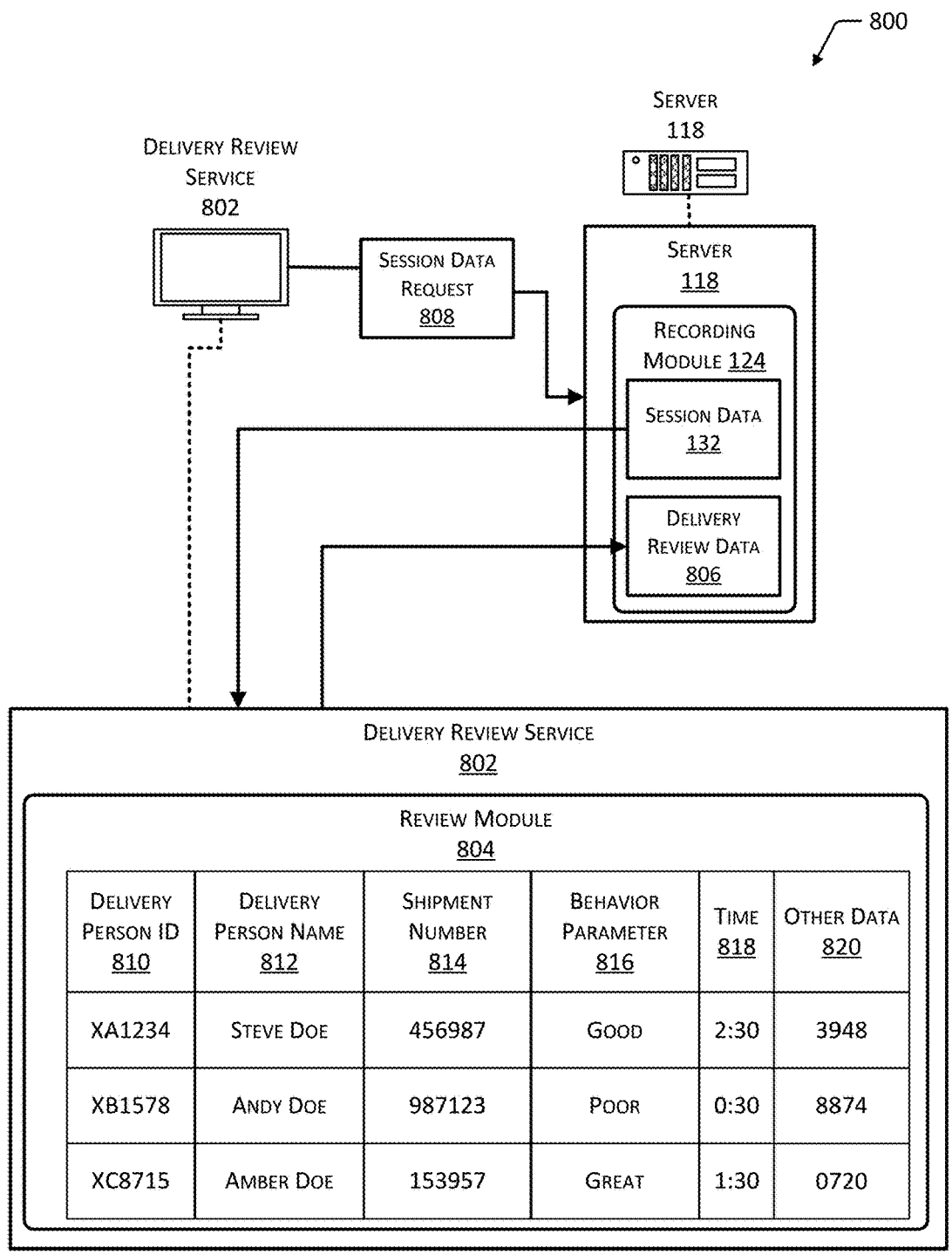
FIG. 8 depicts a schematic of a system for generating delivery person review data based on the session data.

FIG. 8 depicts a schematic of a system 800 for generating delivery review data 806 based on the session data 132. A delivery review service 802 may include a review module 804. The review module 804 may generate delivery review data 806. In one implementation, the delivery review data 806 may be the first user review data, as described above. In other implementations, the delivery review service 802 may send a session data request 808 to the server 118. The session data request 808 may include information such as a delivery person identification number, the delivery person's phone number, order or shipment numbers associated with the delivery person 102(1) delivering them, and so forth. The information may be used by the server 118 or the recording module 124 to identify the corresponding session data 132. The recording module 124 may send the session data 132 to the delivery review service 802. In other implementations, the recording module 124 may enable the delivery review service 802 to access the session data 132.

The review module 804 may generate the delivery review data 806. The review module 804 may include data about the delivery person 102(1) such as delivery person ID 810, delivery person name 812, shipment number 814, behavior parameter 816 indicating a reason for the communication, time 818 indicating a communication duration between the delivery person 102(1) and the user 102(2), or other data 820. For example, the other data 820 may include a second amount of time indicating a second duration from the stopping of the recording to the delivery of the item, a number of times the first user device 108(1) communicated with the second user device 108(2), second information indicating at least behavior of a first user of the first user device 108(1), and so forth. In one implementation, the review module 804 may generate delivery review data 806 that indicates that the delivery person 102(1) communicated with the user 102(2) for five (5) minutes, the type of communication was by voice, the reason for the communication was to obtain directions to deliver the shipment 104, that it took the delivery person 102(1) an additional ten (10) minutes after the communication ended to deliver the shipment 104, that the delivery person 102(1) contacted the user 102(2) twice, and that the delivery person's 102(1) behavior during the first communication was friendly, polite, overall good natured, while during the second communication the delivery person 102(1) appeared rude and upset.

The review module 804 may utilize, or have access to, other systems that analyze data associated with the communication. For example, an ASR system may produce a transcription of the session that is then part of the other data 820. The resulting transcript may be used to produce a metric that is based on one or more of word usage, frequency of occurrence of a word, and so forth. A semantic analysis may be performed on the transcript to determine one or more topics that occurred during the communication. In another example, a voice analysis system may assess the tone of voice, inflection, or other audio attributes of the session to determine metrics or data indicative of stress level, emotional state, and so forth.

The delivery review data 806 may be used to evaluate the delivery person 102(1). In other implementations, the delivery review data 806 may be provided to the business of the delivery person 102(1). The business may use the delivery review data 806 to provide feedback to the delivery person 102(1), as described above.

As illustrated as a non-limiting example in FIG. 8, the data associated with the delivery person ID 810 includes XA1234, XB1578, and XC8715. The delivery person name 812 associated with delivery person ID XA1234 may be Steve Doe. Steve Doe may have delivered the shipment 104 associated with shipment number 456987. The behavior parameter 816 for the shipment number 456987 may be good and the time 818 may be a communication duration of two (2) minutes and thirty (30) seconds. The delivery review data 806 associated with Steve Doe may indicate that Steve is good employee based on the behavior parameter 816 but may need some additional training based on the duration of the communication. The delivery person name 812 associated with delivery person ID XB1578 may be Andy Doe. Andy Doe may have delivered the shipment 104 associated with the shipment number 987123. The behavior parameter 816 for the shipment number 987123 may be poor and the time 818 may be a communication duration of thirty (30) seconds. The delivery review data 806 associated with Andy Doe may indicate that Andy may need additional training, be placed on leave, fired, and so forth. The delivery person name 812 associated with delivery person ID XC8715 may be Amber Doe. Amber Doe may have delivered the shipment 104 associated with shipment number 153957. The behavior parameter 816 for the shipment number 153957 may be great and the time 818 may be a communication duration of one (1) minutes and thirty (30) seconds. The delivery review data 806 associated with Amber Doe may indicate that Amber is a great employee based on the behavior parameter 816 and may deserve a raise or promotion. The review module 804 may send the delivery review data 806 to the recording module 124. The recording module 124 may store the delivery review data 806 associated with the session data 132.

Figure 9:
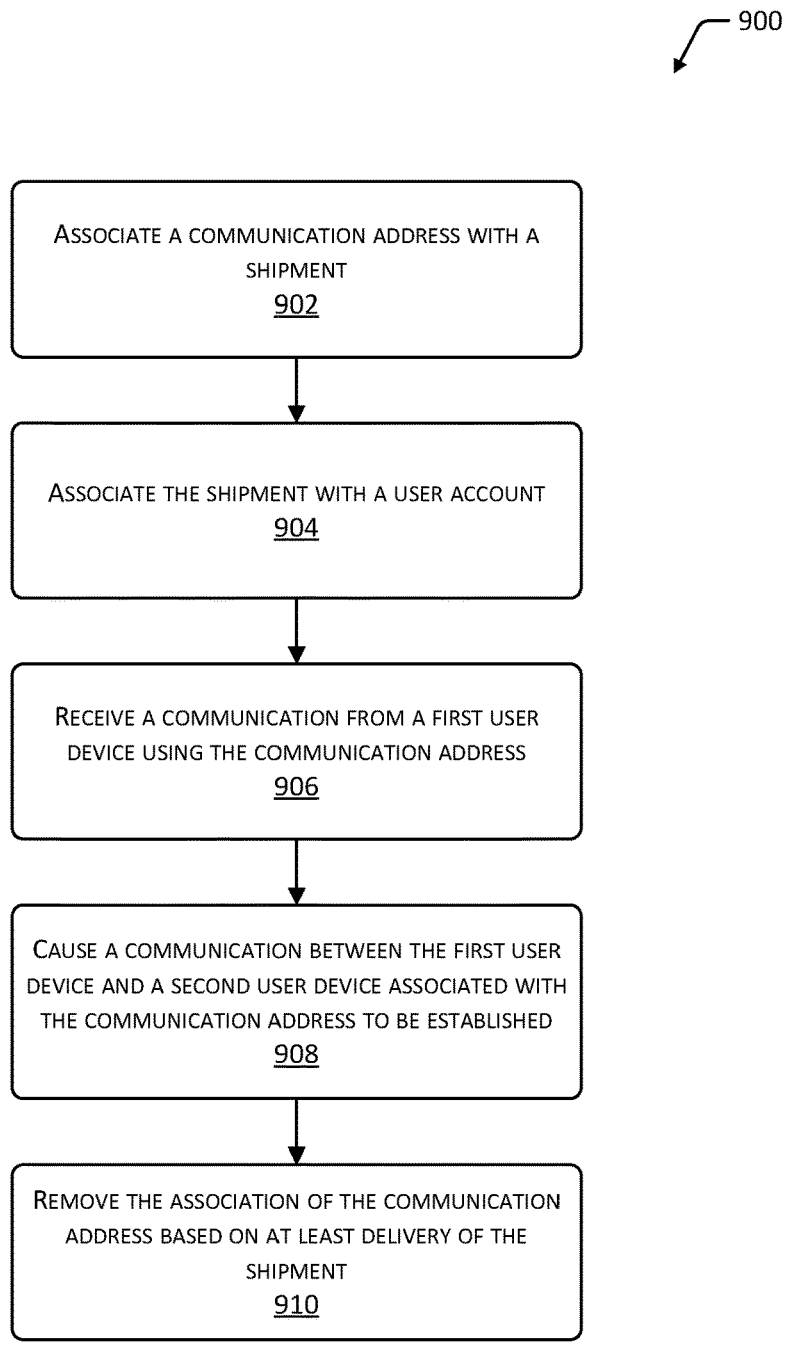
FIG. 9 depicts a flow diagram for protecting user information that is associated with a shipment.

FIG. 9 depicts a flow diagram of a process 900 for protecting user information that is associated with a shipment 104. Although the process 900 is described with reference to the flowchart illustrated in FIG. 9, many other methods for performing the acts associated with the process 900 may be used. For example, the order of the steps may be changed, some of the steps described may be optional, and additional steps may be included.

At 902, the server 118 may associate a communication address with the shipment 104. For example, the server 118 may determine a geographic location based on the shipping address. In this example, the server 118 may determine that the geographic location is the United States. The server 118 may associate the communication address to be a temporary phone number 130, a user name 126, a network address, and so forth. The temporary phone number 130 may be a ten-digit phone number, a seven-digit phone number and an extension number 128, a ten-digit phone number and a shipment number, a seven-digit phone number and the shipment number, and so forth. For example, the server 118 may associate a communication address of 555-5555 based on the shipping address being in the United States. In another example, the application module 120 may associate a communication address of 123-456-7890 with a two-digit country specific code to be entered prior the inputting the communication address.

At 904, the server 118 may associate the shipment 104 with a user account. For example, the server 118 may determine the user account based on the order data 208. The server 118 may determine that the user account is associated with John Doe. The order data 208 is associated with a shipping address of 12 Acorn Drive, Red Pine, Tex. 12345.

At 906, the server 118 may receive a communication from a first user device 108(1) using the communication address. For example, the delivery person 102(1) may need to contact the user 102(2). The user device 108(1) may send the communication data 116(1) to the server 118. The communication data 116(1) may include the communication address, shipment information or a portion thereof, information corresponding to the delivery person 102(1), information corresponding to the user device 108(1), other information associated with the shipment 104, and so forth. For example, the communication data 116(1) may include the temporary phone number 130, the extension number 128, and a zip code as shown on the label 106. The server 118 upon receipt of the communication data 116(1) may determine the user account associated with the communication address. For example, the server 118 may determine that the communication address is associated with a shipment number 456987 for John Doe's user account. The server 118 may confirm that the communication data 116(1) includes the zip code that corresponds to the previously stored zip code for the delivery address of the order. The server 118 may then determine that the user's phone number 130 is 451-4567. The server 118 may access user communication parameters, as described above.

At 908, the server 118 may cause communication to be established between the first user device 108(1) and a second user device 108(2) associated with the second communication address. Continuing the example above, based on the communication data 116(1), including the match of the zip code in the communication data 116(1) to the delivery address zip code that was previously stored, the server 118 may cause communication to be established. For example, the server 118 may act as a proxy for a call, send instructions to initiate a call forward, send instructions to establish a VOIP call, and so forth such that the first user device 108(1) and the second user device 108(2) are able to exchange data with one another.

At 910, the server 118 may remove the association of the communication address based on at least delivery of the shipment 104. For example, the delivery person 102(1) upon delivering the shipment 104 to the user 102(2) may provide a confirmation to the server 118. The server 118, upon receipt of the confirmation, may remove the association of the communication address from the user account. For example, the server 118 may remove the association of the temporary phone number 130 and the extension number 128 from John Doe's user account. In this example, if the delivery person 102(1) or another user attempted to contact the user 102(2) through the use of the temporary phone number 130 and the extension number 128 they would not be able to contact the user 102(2) as the application module 120 would not be able to determine the phone number 130.

Figure 10:
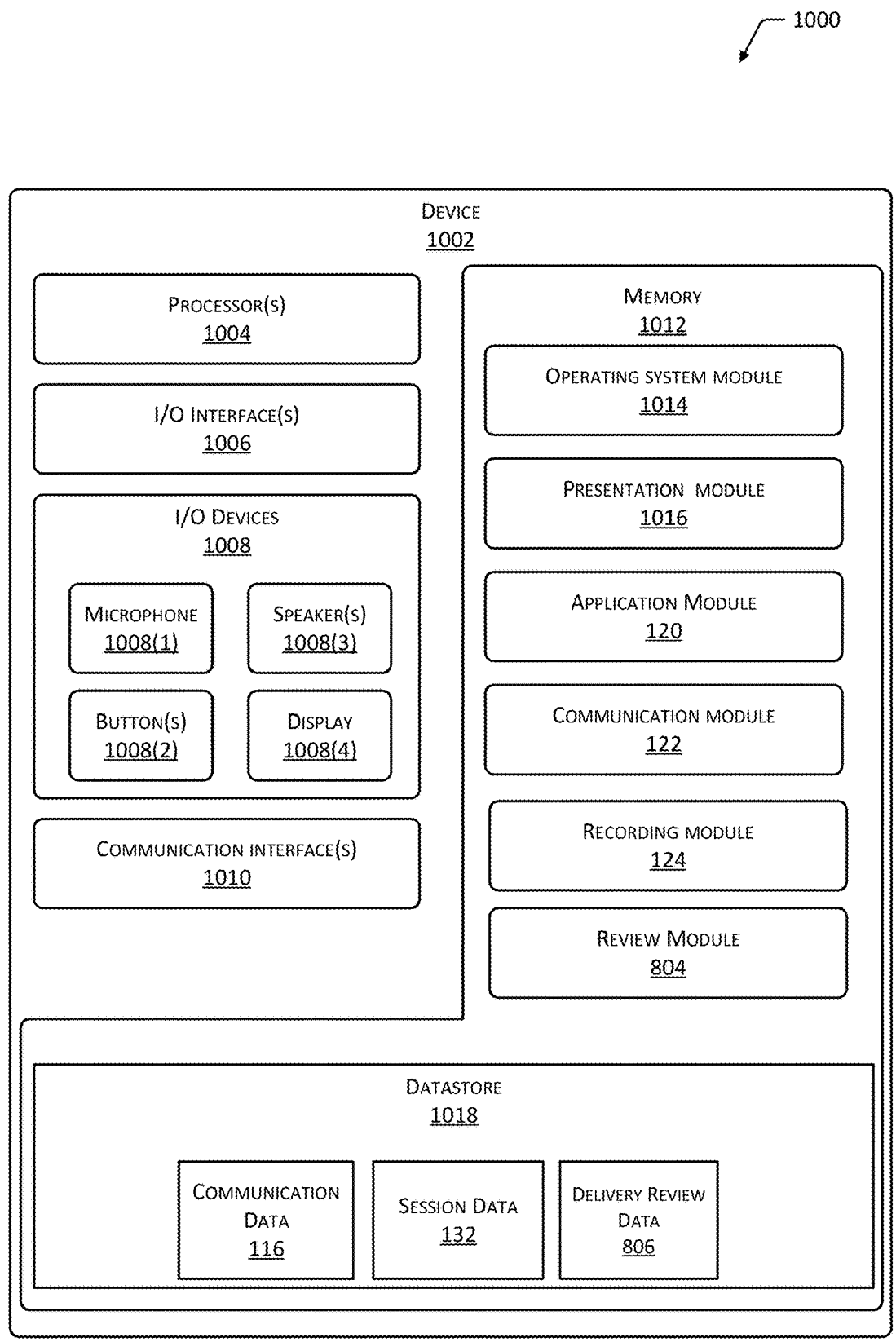
FIG. 10 illustrates a block diagram of a device to protect user information that is associated with a shipment.

FIG. 10 illustrates a block diagram 1000 of a device 1002 to protect user information that is associated with a shipment 104. The device 1002 may be the system, the server 118, the user device 108(1), the user device 108(2), customer service 606, the delivery review service 802, or a combination thereof. The device 1002 is illustrative and non-limiting, and may be a desktop computer, a tablet computer, a server, a wearable computer, an e-book reader, a media device, a cellular phone, a laptop computer, or another suitable apparatus. The device 1002 may include one or more processors 1004 configured to execute one or more stored instructions. The processor(s) 1004 may comprise one or more cores and may also be referred to as hardware processors.

The device 1002 may include one or more input/output (I/O) interface(s) 1006 to allow the processor(s) 1004 or other components of the device 1002 to communicate with various other devices 1002, other computing devices, the server 118, the application module 120, the communication module 122, the recording module 124, the user device 108(1), the user device 108(2), customer service 606, the delivery review service 802, the review module 804, other services, and so on. The I/O interfaces 1006 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 1006 may couple to one or more I/O devices 1008. The I/O devices 1008 may include one or more input devices such as a keyboard, a mouse, a microphone 1008(1), user input buttons 1008(2), and so forth. The I/O devices 1008 may also include output devices such as audio speakers 1008(3), one or more displays 1008(4), and so forth. In some embodiments, the I/O devices 1008 may be physically incorporated within the device 1002, or they may be externally placed. The I/O devices 1008 may include various other devices as well.

The I/O devices 1008 may include sensors, a camera, two-way radio transmitter-receiver, image capturing device, and so forth. For example, the sensor may capture images of the label 106 that relates to the shipment 104, as described above.

The device 1002 may also include one or more communication interfaces 1010. The communication interface(s) 1010 are configured to provide communications with other devices, web-based resources, the user device 108(1), the user device 108(2), the server 118, the application module 120, the communication module 122, the recording module 124, customer service 606, the delivery review service 802, the review module 804, other services, routers, wireless access points, and so forth. The communication interfaces 1010 may include wireless functions, devices configured to couple to one or more networks including local area networks (LANs), wireless LANs, wide area networks (WANs), and so forth. The device 1002 may also include one or more busses or other internal communications hardware or software that allow for the transfer of data between the various modules and components of the device 1002.

The device 1002 includes one or more memories 1012. The memory 1012 comprises one or more computer-readable storage media (CRSM). The memory 1012 provides storage of computer readable instructions, which enables the user device 108(1), the user device 108(2), the server 118, and so forth, to execute one or more instructions, as described above. The memory 1012 may include at least one operating system (OS) module 1014. Respective OS modules 1014 are configured to manage hardware devices such as the I/O interface(s) 1006, the I/O devices 1008, the communication interface(s) 1010, and provide various services to applications or modules executing on the processors 1004.

Also, stored in the memory 1012 may be one or more of the following modules. These modules may be executed as foreground applications, background tasks, daemons, and so forth. A presentation module 1016 may be configured to present the interfaces 110(1), 110(2), and so forth.

The memory 1012 may also include the application module 120. The application module 120, as described above, may include data information about the user 102(2) such as username 126, extension number 128 which has been assigned to the shipment 104, phone number 130 of the user 102(2), and so forth. In other examples, the data may also include one or more parameters indicating user preferences, a shipment number, the temporary phone number 130, and so forth.

The memory 1012 may also include the communication module 122, as described above. The communication module 122 may send communication data 116(2) to the user device 108(2) to establish communication between the user device 108(1) and the user device 108(2). The communication data 116(2) may include information such as the delivery person's name, the business the delivery person is associated with, the delivery person's phone number, and so forth. For example, the communication module 122 may initiate a call to the phone number 451-4567 to establish communication between the user device 108(1) and the user device 108(2).

The memory 1012 may also include the recording module 124, as described above. The recording module 124 may generate the session data 132 that is the recording, with the consent of both parties, of the communication between the delivery person 102(1) and the user 102(2). Upon completion of the communication the recording module 124 may store the session data 132. The recording module 124 may generate first user review data based on the session data 132. The first user review data may include a first amount of time 818 indicating a first duration of the communication between the first user device 108(1) and the second user device 108(2), type of communication between the first user device 108(1) and the second user device 108(2), first information indicating a reason for the communication, a second amount of time 818 indicating a second duration from the stopping of the recording to the delivery of the item, a number of times the first user device 108(1) communicated with the second user device 108(2), second information indicating at least a behavior of a delivery person 102(1) of the first user device 108(1), and so forth. For example, the recording module 124 generates first review user data that indicates that the delivery person 102(1) communicated with the user 102(2) for five (5) minutes, the type of communication was by voice, the reason for the communication was to obtain directions to deliver the shipment 104, that it took the delivery person 102(1) an additional ten (10) minutes after the communication ended to deliver the shipment 104, that the delivery person 102(1) contacted the user 102(2) twice, and that the delivery person's 102(1) behavior during the first communication was friendly, polite, overall good natured, while during the second communication the delivery person 102(1) appeared rude and upset. The first user review data may be used to evaluate the delivery person 102(1). In other implementations, the first user review data may be provided to the business of the delivery person 102(1). The business may use the first user review data to provide feedback to the delivery person 102(1).

The memory 1012 may include the review module 804, as described above. The review module 804 may generate delivery review data 806. In one implementation, the delivery review data 806 may be the first user review data, as described above. In other implementations, the delivery review service 802 may send a session data request 808 to the server 118, as described above.

The memory 1012 may also include a datastore 1018 to store information. The datastore 1018 may correspond to the datastore 212, as described above. The datastore 1018 may use a flat file, database, linked list, tree, executable code, or other data structure to store the information. In some implementations, the datastore 1018 or a portion of the datastore 1018 may be distributed across the server 118, the user devices 108(1), 108(2), the application module 120, the communication module 122, the recording module 124, the review module 804, the datastore 212, and so forth.

The datastore 1018 may store the communication data 116(1), 116(2), . . . , 116(N), the session data 132, the delivery review data 806, and so forth. As described above, the communication data 116(1), 116(2), . . . , 116(N) may include the communication address, shipment information, information corresponding to the delivery person 102(1), information corresponding to the user device 108(1) and so forth. For example, the communication data 116(1) may include the temporary phone number 130 and the extension number 128. The session data 132, as described above, may store the communication between the delivery person 102(1) and the user 102(2). The delivery review data 806, as described above, may be based on the session data 132. The delivery review data 806 may include data information about the delivery person 102(1) such as delivery person ID 810, delivery person name 812, shipment number 814, behavior parameter 816 indicating a reason for the communication, a second amount of time 818 indicating a second duration from the stopping of the recording to the delivery of the item, a number of times the first user device 108(1) communicated with the second user device 108(2), second information indicating at least behavior of a delivery person 102(1) of the first user device 108(1), and so forth. For example, the review module 804 may generate delivery review data 806 that indicates that the delivery person 102(1) communicated with the user 102(2) for five (5) minutes, the type of communication was by voice, the reason for the communication was to obtain directions to deliver the shipment 104, that it took the delivery person 102(1) an additional ten (10) minutes after the communication ended to deliver the shipment 104, that the delivery person 102(1) contacted the user 102(2) twice, and that the delivery person's 102(1) behavior during the first communication was friendly, polite, overall good natured, while during the second communication the delivery person 102(1) appeared rude and upset.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

What is claimed is:

1. A system comprising:
a server comprising:
a memory storing computer-executable instructions; and
at least one processor in communication with the memory, the at least one processor executes the computer-executable instructions to:
determine order data indicative of an order for an item;
determine a user account and a shipping address associated with the order;
determine a geographic location based on the shipping address;
based on the geographic location, associate with the order data a first phone number specific to the geographic location;
assign an extension number to the order data associated with the order of the item;
generate shipping information that includes the first phone number and the extension number;
receive communication data from a first user device that includes the first phone number and the extension number associated with the order data;
determine a second phone number associated with the user account;
cause communication to be established between the first user device and a second user device associated with the second phone number;
receive delivery confirmation data that indicates that the order has been delivered; and
based on the delivery of the order, remove the association of the first phone number and the extension number from the order data.

2. The system of claim 1, wherein the at least one processor of the server further executes the computer-executable instructions to:
access a recording of the communication between the first user device and the second user device; and
generate first user review data based on the recording, wherein the first user review data includes one or more data indicating:
a first amount of time indicating a first duration of the communication between the first user device and the second user device,
type of communication between the first user device and the second user device,
first information indicating a reason for the communication,
a second amount of time indicating a second duration from a conclusion of the communication between the first user device and the second user device and the delivery of the item, a number of times the first user device communicated with the second user device, or
second information indicating at least behavior of a first user of the first user device.

3. The system of claim 1, wherein the communication between the first user device and the second user device comprises one or more of:
voice communication,
a short message service (SMS) message,
a multimedia messaging service (MMS),
an instant message,
a voice to SMS,
a SMS to voice communication,
a voice to MMS communication,
an MMS to voice communication,
a voice to instant message,
an instant message to voice, or
an electronic mail.

4. A method comprising:
associating a shipment with a user account;
associating a first phone number with the shipment;
determining a second phone number associated with the user account;
receiving a call from a first user device using the first phone number;
causing communication to be established between the first user device and a second user device associated with the second phone number; and
removing the association of the first phone number from the user account based at least in part on data indicative of delivery of the shipment.

5. The method of claim 4, wherein the delivery of the shipment comprises one or more of:
receiving first information indicating that a user has accepted the delivery of the shipment, or
receiving second information indicating that a threshold period of time has passed since the delivery of the shipment.

6. The method of claim 4, wherein the first phone number is a local phone number specific to a geographic region of a shipping address associated with the shipment.

7. The method of claim 4, wherein establishing the communication further comprises:
determining the user account that is associated with the shipment; and
determining the second phone number is associated with the user account.

8. The method of claim 4, further comprising:
receiving an item recall notification associated with an item in the shipment;
assigning a third phone number to the shipment;
generating item recall notification data that includes the item recall notification and the third phone number; and
sending the item recall notification data.

9. The method of claim 4, further comprising:
accessing a recording of the communication between the first user device and the second user device; and
generating first user review data based on the recording, wherein the first user review data includes data indicative of one or more of:
a first amount of time indicating a first duration of the communication between the first user device and the second user device,
type of communication between the first user device and the second user device,
first information indicating a reason for the communication,
a second amount of time indicating a second duration from a conclusion of the communication between the first user device and the second user device and delivery of the shipment,
a number of times the first user device communicated with the second user device, or
second information indicating at least behavior of a first user of the first user device.

10. The method of claim 4, further comprising:
receiving data indicating that the shipment has been delivered to an area associated with a shipping address of the shipment, wherein the area comprises one or more of:
a front door area associated with a user's residence,
a receiving area associated with a business residence,
a locker area that stores shipments, or
a vehicle associated with the user account;
providing a notification that the shipment is delivered to the area;
providing one or more user control input options to confirm receipt of the shipment;
receiving an input command confirming receipt of the shipment; and
wherein removing the association of the first phone number from the user account is further based on receiving the input command.

11. The method of claim 4, further comprising:
receiving a request for a second call, from the second user device associated with the second phone number, to the first phone number; and
causing a second communication to be established between the second user device and a third user device.

12. A device comprising:
at least one memory storing computer-executable instructions; and
at least one processor in communication with the memory, the at least one processor executes the computer-executable instructions to:
associate a shipment with a first communication address and a second communication address;
receive, from a first user device, a request for communication with the first communication address;
based on the association, cause communication to be established between the first user device and a second user device that is associated with the second communication address; and
disassociate the first communication address from the shipment based at least in part on data indicative of delivery of the shipment.

13. The device of claim 12, wherein the at least one processor further executes computer-executable instructions to:
receive image data that indicates that the shipment has been delivered to an area associated with a shipping address of the shipment, wherein the area comprises one or more of:
a front door area associated with a user's residence,
a receiving area associated with a business residence,
a locker area that stores shipments, or
a vehicle associated with a user account; and
wherein the disassociation of the first communication address from the shipment is further responsive to the image data.

14. The device of claim 12, wherein the at least one processor further executes computer-executable instructions to:

access a recording of the communication between the first user device and the second user device; and generate first user review data based on the recording, wherein the first user review data includes one or more data indicating:
- a first amount of time indicating a first duration of the communication between the first user device and the second user device,
- type of communication between the first user device and the second user device,
- first information indicating a reason for the communication,
- a second amount of time indicating a second duration from a conclusion of the communication between the first user device and the second user device and delivery of the shipment,
- a number of times the first user device communicated with the second user device, or
- second information indicating at least behavior of a first user of the first user device.

15. The device of claim 12, wherein the at least one processor further executes computer-executable instructions to:
- receive a second communication from the second user device associated with the second communication address;
- determine that the communication was initiated through the use of the first communication address; and
- establish communication between the second user device and a third user device.

16. The device of claim 12, wherein the at least one processor further executes computer-executable instructions to:
- access preference data that indicates a period of time to provide notifications;
- provide a notification that the shipment is delivered to an area associated with a shipping address of the shipment during the period of time, wherein the area comprises one or more of:
  - a front door area associated with a user's residence,
  - a receiving area associated with a business residence,
  - a locker area that stores shipments, or
  - a vehicle associated with a user account;
- provide one or more user control input options to confirm receipt of the shipment;
- receive an input command confirming receipt of the shipment; and
- wherein the disassociation of the first communication address from the shipment is further responsive to receipt of the input command.

17. The device of claim 12, wherein one or more of the first communication address or the second communication address comprises one or more of:
- a telephone number,
- a telephone number and an extension number,
- a network address, or
- a user name.

18. The device of claim 12, wherein the disassociation of the first communication address from the shipment is responsive to a threshold period of time having passed since the delivery of the shipment.

19. The device of claim 12, wherein the at least one processor further executes computer-executable instructions to:
- receive image data indicating that the shipment has been delivered;
- provide a notification that the shipment has been delivered;
- provide one or more user control input options to confirm receipt of the shipment;
- receive an input command confirming receipt of the shipment; and
- the disassociation of the first communication address from the shipment is responsive to receipt of the input command.

20. The device of claim 12, wherein the at least one processor further executes computer-executable instructions to:
- determine a user account that is associated with the shipment; and
- determine, based on the user account, the second communication address.

* * * * *